United States Patent
Dannoux

(10) Patent No.: US 10,550,035 B2
(45) Date of Patent: Feb. 4, 2020

(54) APPARATUSES FOR HOLDING AND CONVEYING GLASS ARTICLES

(71) Applicant: CORNING INCORPORATED, Corning, NY (US)

(72) Inventor: Thierry Luc Alain Dannoux, Avon (FR)

(73) Assignee: CORNING INCORPORATED, Corning, NY (US)

( * ) Notice: Subject to any disclaimer, the term of this patent is extended or adjusted under 35 U.S.C. 154(b) by 225 days.

(21) Appl. No.: 15/625,809

(22) Filed: Jun. 16, 2017

(65) Prior Publication Data
US 2017/0369368 A1    Dec. 28, 2017

Related U.S. Application Data

(60) Provisional application No. 62/353,427, filed on Jun. 22, 2016.

(51) Int. Cl.
*C03C 21/00*    (2006.01)
*B65G 15/48*    (2006.01)
(Continued)

(52) U.S. Cl.
CPC ............ *C03C 21/002* (2013.01); *B65G 15/48* (2013.01); *B65G 49/045* (2013.01);
(Continued)

(58) Field of Classification Search
CPC ... C03C 21/002; C03C 21/001; C03C 21/005; B65G 15/02; B65G 15/12; B65G 15/14;
(Continued)

(56) References Cited

U.S. PATENT DOCUMENTS 1,642,824 A  *  9/1927  Paulson ................. B08B 9/423
                                                    198/802
1,724,336 A  *  8/1929  Ayers ..................... B08B 9/426
                                                    118/503
(Continued)

FOREIGN PATENT DOCUMENTS

WO    2011149812 A1    12/2011
WO    2013130649 A1    9/2013

OTHER PUBLICATIONS

Wang et. Al., Solar Energy Materials and Solar Cells, vol. 100, May 2012, pp. 162-168 (Year: 2012).*
(Continued)

*Primary Examiner* — Jason L Lazorcik
(74) *Attorney, Agent, or Firm* — Dinsmore & Shohl LLP

(57) ABSTRACT

In embodiments, a conveyor apparatus can include a conveyor ribbon having a length, a width, a thickness less than the width, and a plurality of receiving apertures located along the length and extending through the thickness of the conveyor ribbon. The plurality of receiving apertures are dimensioned to receive and hold a plurality of glass articles. A conveyor drive and guidance system directs the conveyor ribbon along a predefined conveyor path. The predefined conveyor path can include an immersion section and a drain section. The immersion section can be oriented to direct the conveyor ribbon into and out of an immersion station and the conveyor ribbon is rotated about a horizontal axis in the drain section after being directed out of the immersion station.

22 Claims, 19 Drawing Sheets

(51) Int. Cl.
*B65G 49/04* (2006.01)
*B65G 49/05* (2006.01)

(52) U.S. Cl.
CPC ......... *B65G 49/0418* (2013.01); *B65G 49/05* (2013.01); *B65G 2201/0247* (2013.01); *B65G 2812/02188* (2013.01)

(58) Field of Classification Search
CPC ......... B08B 3/041; B08B 3/042; B08B 3/123; B08B 3/126; B08B 9/20; B08B 9/205; B08B 9/22; B08B 9/24; B08B 9/26; B08B 9/42; B08B 9/423; B08B 9/426
See application file for complete search history.

(56) References Cited

U.S. PATENT DOCUMENTS

| | | | | |
|---|---|---|---|---|
| 1,740,233 A * | 12/1929 | Enz | ......................... | B08B 9/426 198/803.15 |
| 2,094,398 A * | 9/1937 | Dostal | ..................... | B08B 9/426 134/128 |
| 2,108,227 A * | 2/1938 | Ladewig | ................... | B08B 9/42 15/61 |
| 2,210,529 A * | 8/1940 | Dostal | ..................... | B08B 9/42 198/803.15 |
| 2,223,060 A * | 11/1940 | Dostal | ..................... | B08B 9/426 198/803.15 |
| 2,223,846 A * | 12/1940 | Dostal | ..................... | B08B 9/426 198/803.15 |
| 2,240,717 A * | 5/1941 | Read | ....................... | B08B 9/426 134/128 |
| 2,245,263 A * | 6/1941 | Dostal | ..................... | B08B 9/426 198/803.15 |
| 2,258,717 A * | 10/1941 | Read | ....................... | B08B 9/426 198/803.15 |
| 2,342,820 A * | 2/1944 | Read | ....................... | B08B 9/423 198/803.15 |
| 2,344,000 A * | 3/1944 | Read | ....................... | B08B 9/423 198/803.15 |
| 2,522,912 A * | 9/1950 | Weiss | ...................... | B08B 9/423 198/803.15 |
| 2,912,096 A * | 11/1959 | Welliver | ................. | B08B 9/423 134/124 |
| 2,984,334 A * | 5/1961 | Dungfelder | ............. | B08B 9/423 198/803.15 |
| 3,101,834 A * | 8/1963 | Meyer | ..................... | B08B 9/423 198/803.15 |
| 3,106,283 A * | 10/1963 | Meyer | ..................... | B08B 9/423 198/803.15 |
| 3,292,646 A * | 12/1966 | Pollock | .................... | B08B 9/42 134/134 |
| 3,590,982 A | 7/1971 | Banyas | | |
| 3,628,934 A * | 12/1971 | Duthoit | ................. | C03C 21/001 65/114 |
| 3,658,073 A * | 4/1972 | Friedhelm | ................ | B08B 9/42 134/72 |
| 3,938,977 A * | 2/1976 | Gliemeroth | ............... | C03C 4/06 65/30.11 |
| 4,125,154 A * | 11/1978 | Franke | ............... | B65G 49/0418 126/343.5 A |
| 4,217,941 A * | 8/1980 | Catalano | ................ | B65G 65/24 141/319 |
| 4,533,038 A * | 8/1985 | Richard | ................. | B65G 17/12 198/803.15 |
| 5,248,045 A * | 9/1993 | Alvelda | .................... | B03B 5/28 198/493 |
| 5,285,801 A * | 2/1994 | Klenk | ..................... | B08B 9/426 134/124 |
| 5,353,908 A * | 10/1994 | Wihlidal | ................. | B08B 9/426 198/339.1 |
| 2003/0196455 A1* | 10/2003 | McCoy | ................... | C03C 21/001 65/30.13 |
| 2004/0245791 A1* | 12/2004 | Tye | ........................ | B08B 9/426 294/103.1 |
| 2007/0163622 A1* | 7/2007 | Avelis | ...................... | B08B 9/30 134/22.1 |
| 2009/0211880 A1 | 8/2009 | Klaiber et al. | | |
| 2009/0218194 A1* | 9/2009 | Menke | ................... | B65G 17/48 198/404 |
| 2010/0034631 A1 | 2/2010 | Klaiber et al. | | |
| 2010/0047521 A1 | 2/2010 | Amin et al. | | |
| 2010/0071724 A1* | 3/2010 | Baumgartner | ............ | A61L 2/18 134/23 |
| 2014/0120215 A1 | 5/2014 | Stokoe et al. | | |
| 2014/0345325 A1 | 11/2014 | Allan et al. | | |
| 2016/0157606 A1* | 6/2016 | Kaelin | ..................... | B08B 9/42 211/74 |

OTHER PUBLICATIONS

International Search Report and Written Opinion dated Sep. 13, 2017, for PCT/US2017/037986 filed Jun. 16, 2017. pp. 1-13.

\* cited by examiner

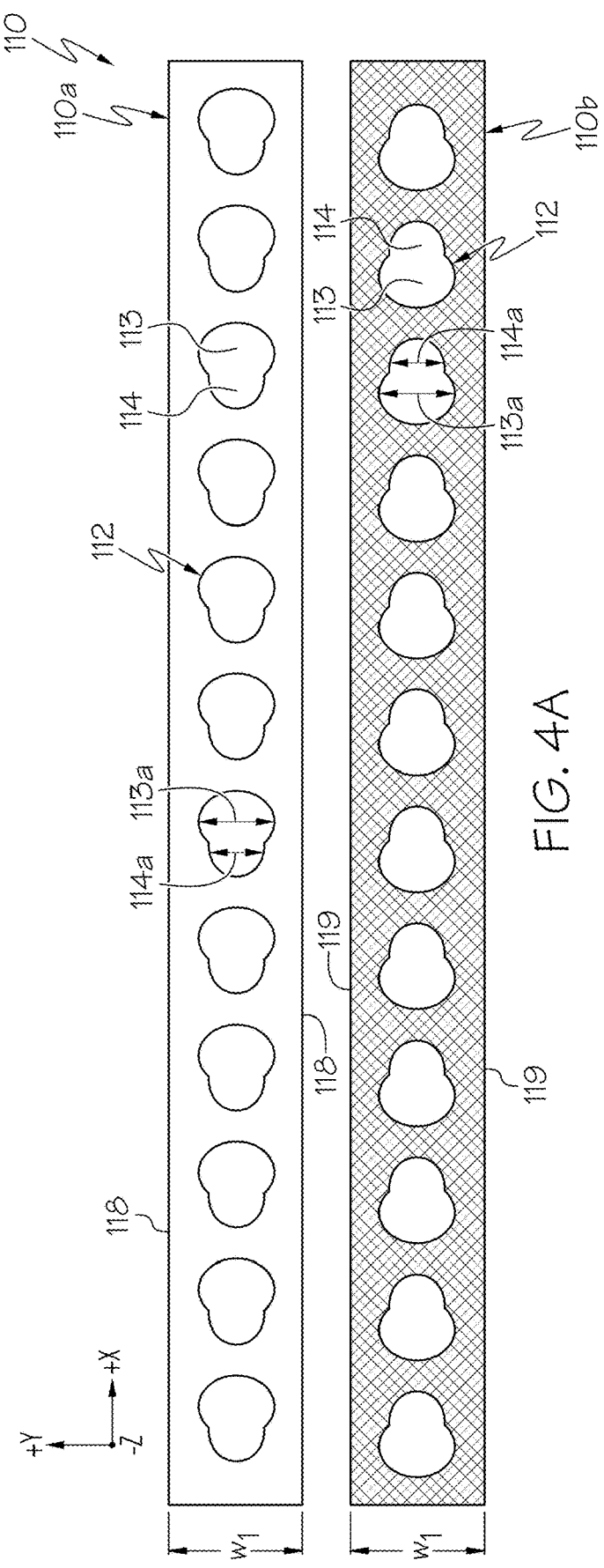
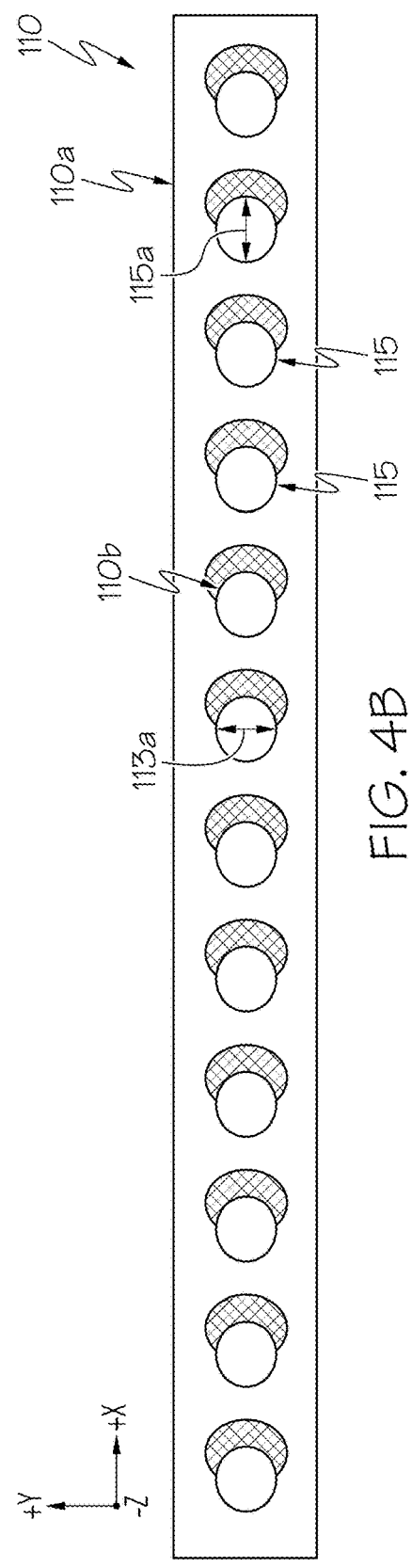
FIG. 4A
FIG. 4B

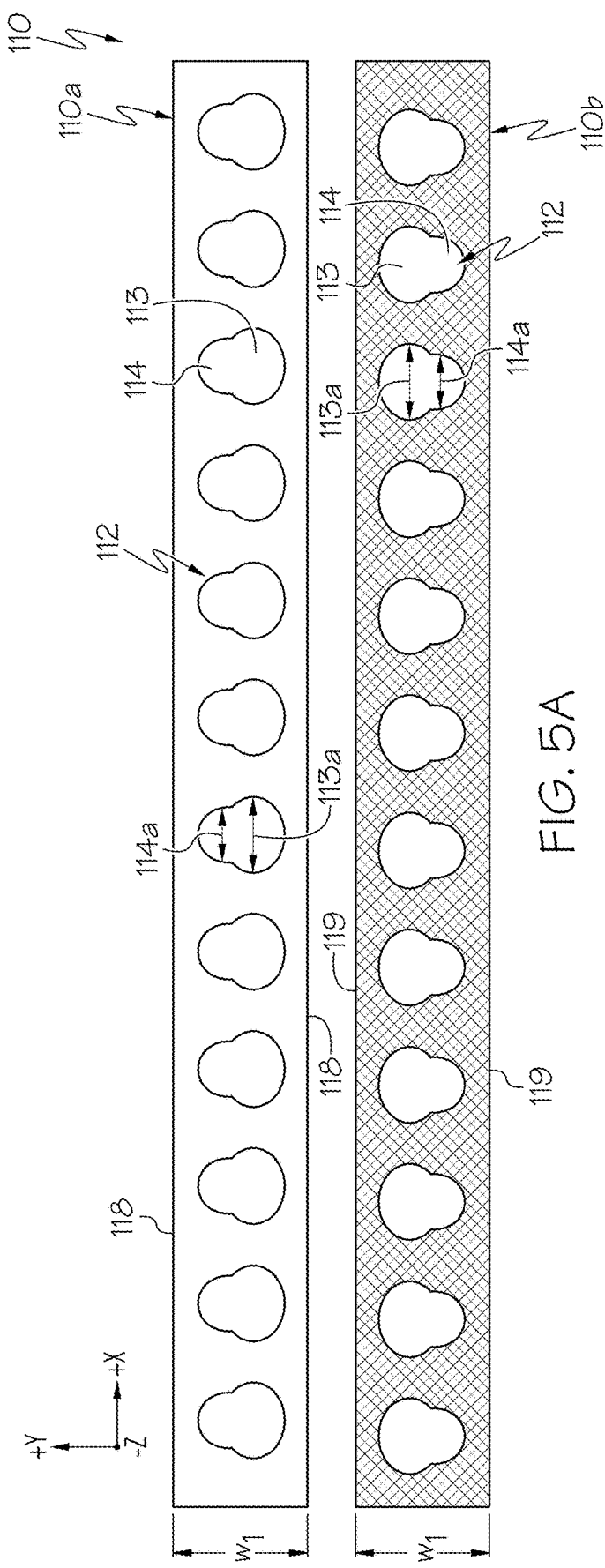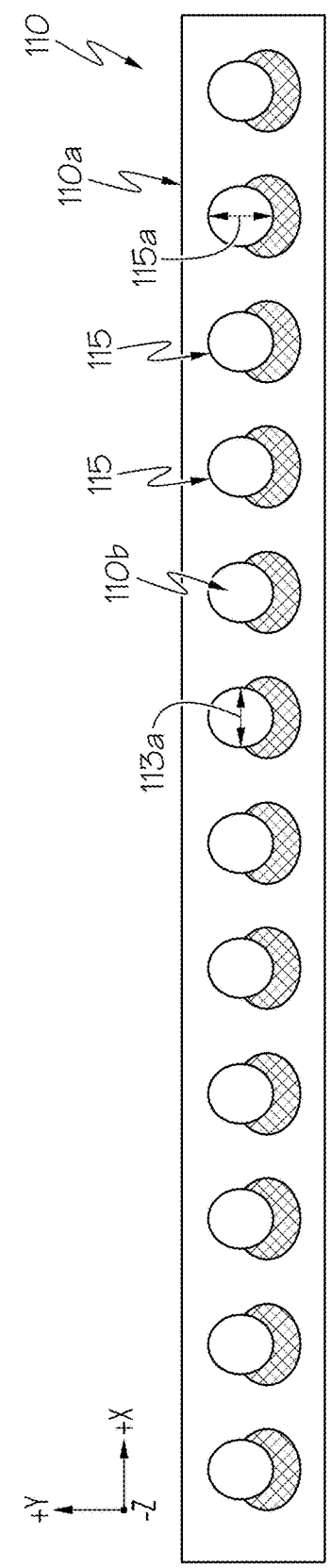
FIG. 5A
FIG. 5B

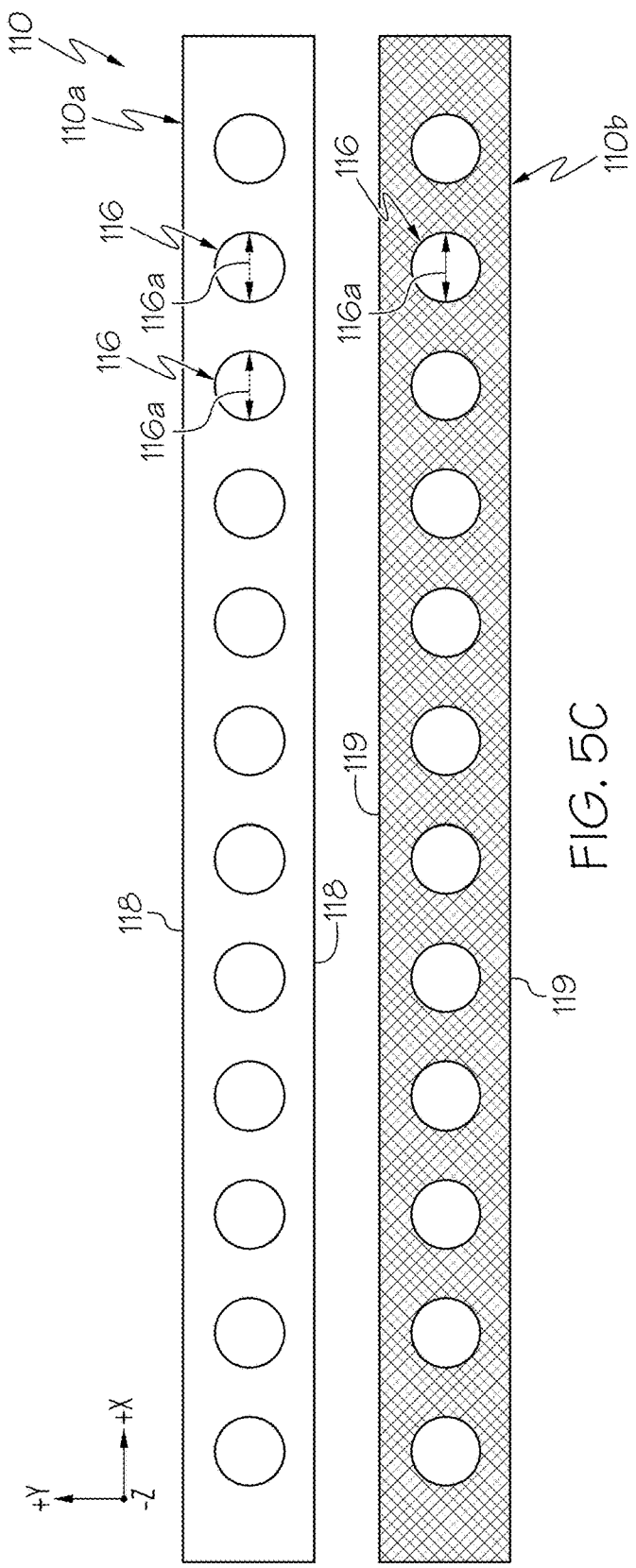
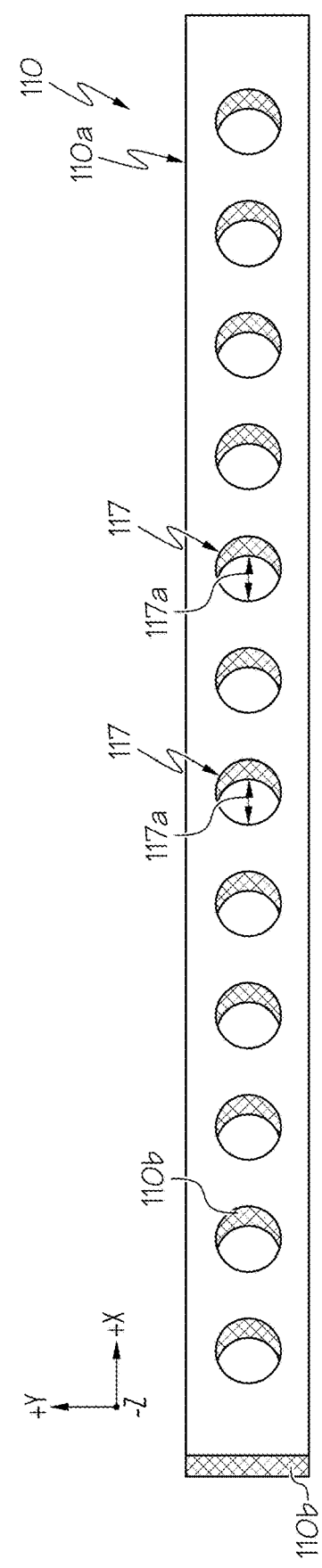
FIG. 5C
FIG. 5D

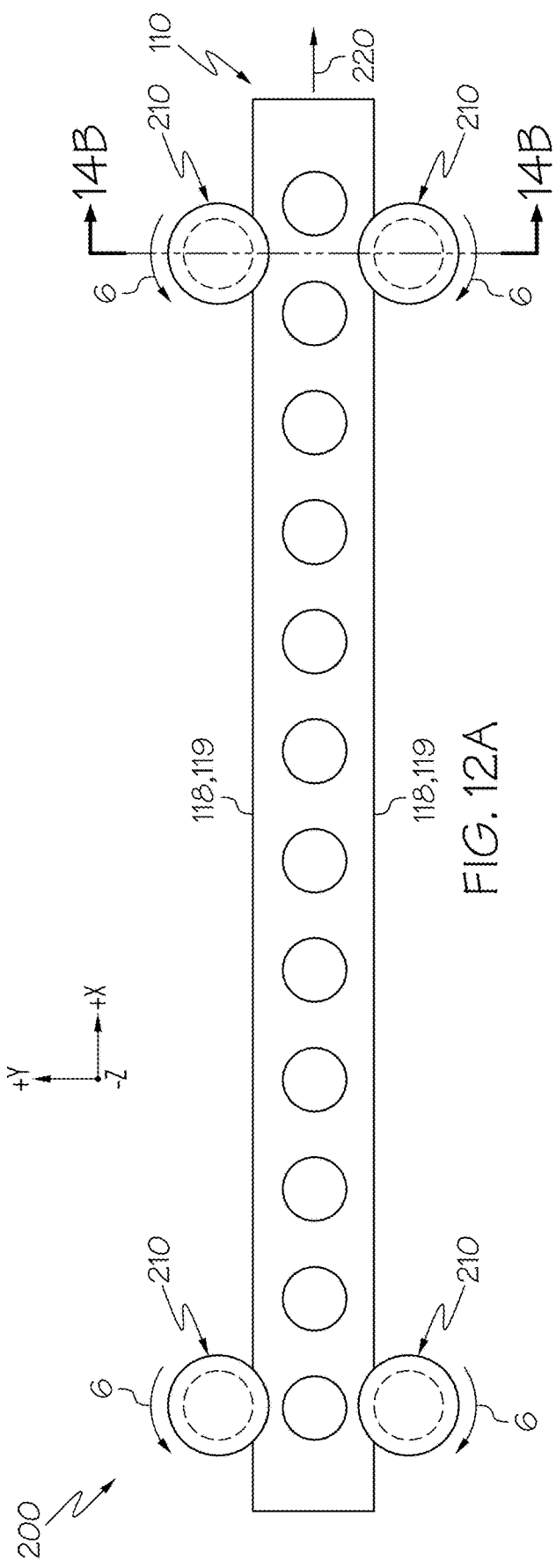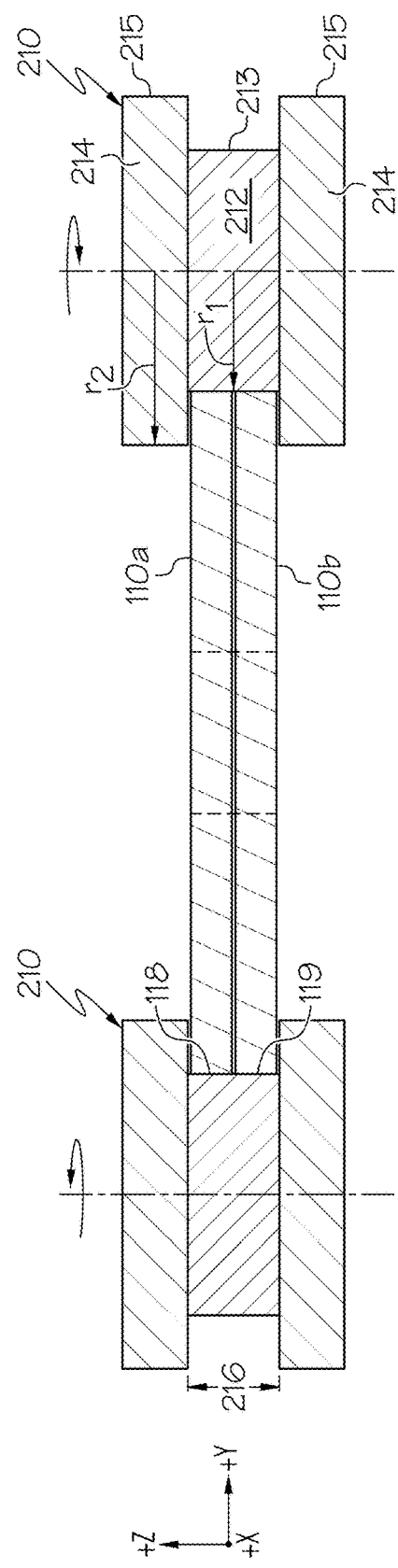
FIG. 12A
FIG. 12B

US 10,550,035 B2

APPARATUSES FOR HOLDING AND CONVEYING GLASS ARTICLES

CROSS REFERENCE TO RELATED APPLICATIONS

The present application claims priority to U.S. Provisional Application No. 62/353,427 filed Jun. 22, 2016, entitled, "Apparatuses for Holding and Conveying Glass Articles," the entirety of which is incorporated by reference herein.

BACKGROUND

Field

The present specification generally relates to apparatuses for holding glass articles during processing and, more specifically, to conveyor ribbon apparatuses for holding glass articles during processing.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent glass articles and contact between the glass and equipment, such as handling and/or filling equipment.

Accordingly, a need exists for alternative apparatuses for holding and conveying glass articles during processing to mitigate glass breakage while allowing for access with the interior and exterior regions of the glass articles with processing fluids, such as molten salt for ion-exchange or the like.

SUMMARY

According to one embodiment, a conveyor apparatus may hold and convey articles during processing. The conveyor apparatus can include a conveyor ribbon having a length, a width, a thickness less than the width, and a plurality of receiving apertures located along the length and extending through the thickness of the conveyor ribbon. The plurality of receiving apertures are dimensioned to receive and hold a plurality of articles. A conveyor drive and guidance system can direct the conveyor ribbon along a predefined conveyor path. The predefined conveyor path can include an immersion section and a drain section. The immersion section can be oriented to direct the conveyor ribbon into and out of an immersion station and the conveyor ribbon is rotated about a horizontal axis in the drain section after being directed out of the immersion station. The plurality of receiving apertures may each have a keyhole shape with a first portion having a first diameter and a second portion having a second diameter. The first portions are dimensioned for receiving articles and the second portions are dimensioned for retaining articles. The thickness of the conveyor ribbon may be from about 150 micrometers to about 400 micrometers.

In another embodiment, a conveyor apparatus may be part of an ion-exchange system. The ion-exchange system includes an immersion tank (e.g. an ion-exchange tank) for containing liquid (e.g. molten salt) and a conveyor ribbon with a length, a width, a thickness less than the width, and a plurality of receiving apertures located along the length and extending through the thickness of the conveyor ribbon. A conveyor drive and guide system is included and is engaged with and directs the conveyor ribbon through an immersion tank section and a drain section. The conveyor ribbon extends through at least a portion of the immersion tank in the immersion tank section and is rotated about a horizontal axis in the drain section. Each of the plurality of receiving apertures may have a keyhole shape with a first portion that has a first diameter and a second portion that has a second diameter. The first portions are dimensioned for receiving articles (e.g. glass articles) into the conveyor ribbon and the second portions are dimensioned for retaining articles in the conveyor ribbon. The conveyor ribbon may include a top ribbon with a plurality of top ribbon apertures and a bottom ribbon with a plurality of bottom ribbon apertures. The top ribbon is translatable with respect to the bottom ribbon such that the plurality of top ribbon apertures and the plurality of bottom ribbon apertures align to form the plurality of receiving apertures extending through the thickness of the conveyor ribbon. The conveyor ribbon may have an open position and a lock position. In the open position, the plurality of top ribbon apertures are coaxial with the plurality of bottom ribbon apertures and provide a first opening. In the lock position, the plurality of top ribbon apertures are offset from the plurality of bottom ribbon apertures and provide a second opening. The first opening is dimensioned for receiving articles into the conveyor ribbon and the second opening is dimensioned for retaining articles within the conveyor ribbon. The top ribbon may have a thickness from about 50 micrometers to about 75 micrometers and the bottom ribbon may have a thickness from about 150 micrometers to about 400 micrometers.

In yet another embodiment, a method for processing a plurality of glass articles includes loading and retaining a plurality of glass articles into a plurality of receiving apertures of a conveyor ribbon. The conveyor ribbon extends along a predefined conveyor path that includes an ion-exchange tank section and a drain section. The conveyor ribbon extends through at least a portion of an ion-exchange tank in the ion-exchange tank section and is rotated about a horizontal axis in the drain section. The conveyor ribbon is directed along the ion-exchange tank section of the predefined conveyor path and the plurality of glass articles are submerged in the ion-exchange tank containing molten salt. The conveyor ribbon is directed from the ion-exchange tank section to the drain section and the conveyor ribbon with the plurality of glass articles is rotated about a horizontal axis such that molten salt is drained from the plurality of glass articles. The predefined conveyor path may extend through a plurality of ion-exchange tanks and the conveyor ribbon may be directed along the predefined conveyor path and through the plurality of ion-exchange tanks.

Additional features and advantages of the apparatuses for holding and retaining glassware during processing described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF DRAWINGS

FIG. 4A schematically depicts a top view of a conveyor ribbon, according to one or more embodiments shown and described herein;

FIG. 4B schematically depicts a top view of a conveyor ribbon, according to one or more embodiments shown and described herein;

FIG. 5A schematically depicts a top view of a conveyor ribbon, according to one or more embodiments shown and described herein;

FIG. 5B schematically depicts a top view of a conveyor ribbon, according to one or more embodiments shown and described herein;

FIG. 5C schematically depicts a top view of a conveyor ribbon, according to one or more embodiments shown and described herein;

FIG. 5D schematically depicts a top view of a conveyor ribbon, according to one or more embodiments shown and described herein;

FIG. 12A schematically depicts a top view of a conveyor drive and guidance system, according to one or more embodiments shown and described herein;

FIG. 12B schematically depicts an end view of a conveyor drive and guidance system, according to one or more embodiments shown and described herein;

DESCRIPTION OF EMBODIMENTS

Figure 1:
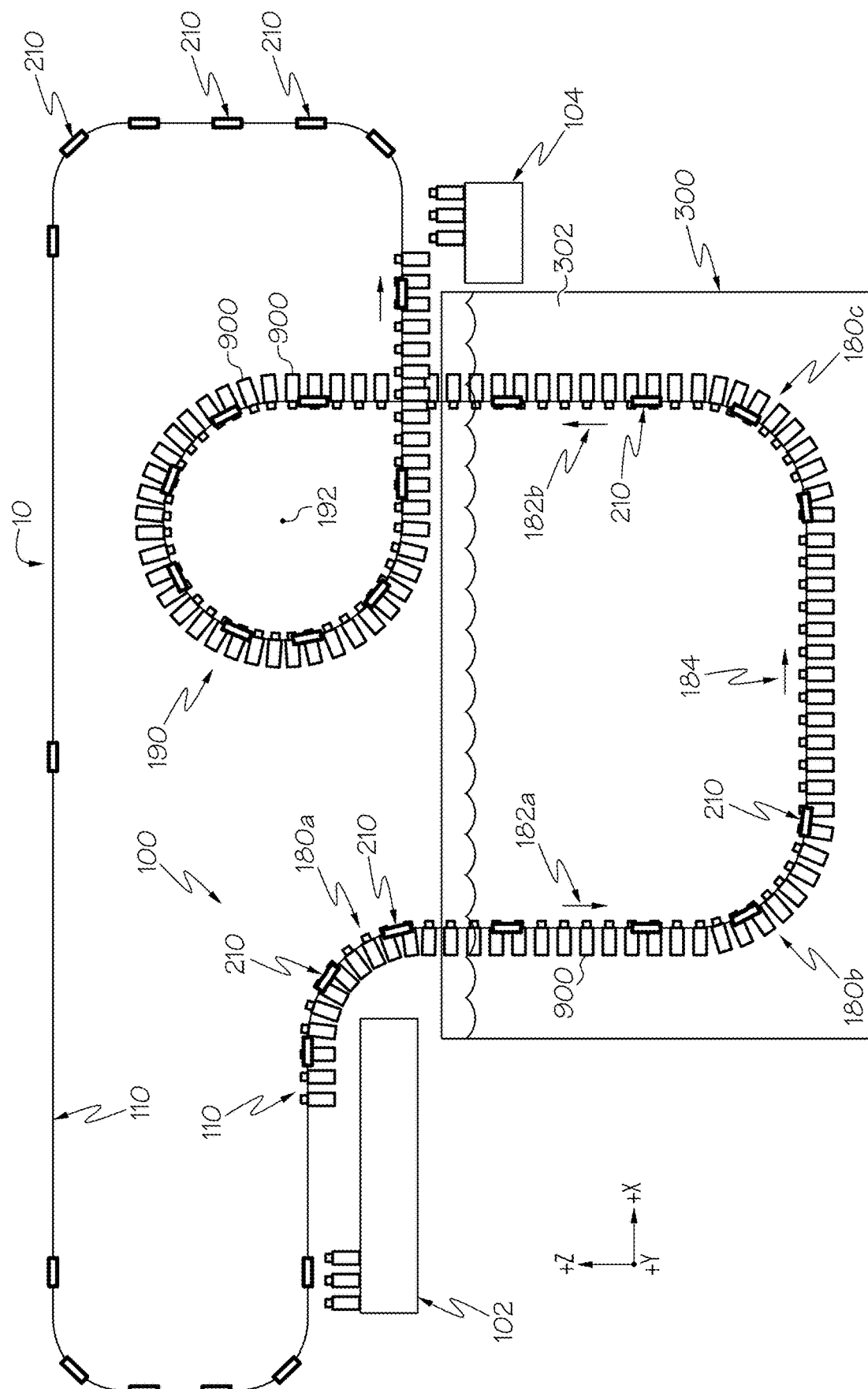
FIG. 1 schematically depicts a conveyor apparatus, according to one or more embodiments shown and described herein.

Reference will now be made in detail to embodiments of conveyor ribbons and conveyor apparatuses for holding and retaining articles during processing, examples of which are illustrated in the accompanying drawings. Whenever possible, the same reference numerals will be used throughout the drawings to refer to the same or like parts. One embodiment of a conveyor apparatus for holding and retaining articles during processing is schematically depicted in FIG. 1. The conveyor apparatus generally includes a conveyor ribbon that holds and retains a plurality of articles. The conveyor ribbon has a plurality of apertures (FIGS. 1-10) which allow for the plurality of articles to be loaded into the conveyor ribbon at a loading station. The articles are loaded into the conveyor ribbon by a portion of an article passing through the conveyor ribbon such that a top portion of the article is held on one side of the conveyor ribbon and a body of the article is held on an opposite side of the conveyor ribbon. A conveyor ribbon drive and guidance system directs the conveyor ribbon with the plurality of articles through an immersion section and a drain section. In the immersion section the articles are immersed in a liquid for a predetermined amount of time. Upon exiting the immersion section, the conveyor ribbon drive and guidance system directs the conveyor ribbon with the plurality of articles through the drain section which rotates the glass articles about a horizontal axis and allows for liquid within or on the articles to drain. The conveyor ribbon with the plurality of articles then proceeds to another station, e.g. another immersion section, a washing section, etc., before the articles are removed from the conveyor ribbon at an unloading station and the conveyor ribbon returns back to the loading station to receive additional articles to be processed. Various embodiments of apparatuses for holding and conveying glass articles during processing will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As noted herein, the breakage of glass articles during processing and/or filling is a source of product loss and may lead to process inefficiencies and increased costs. Additionally, cosmetic flaws in glass articles are also undesirable to users. Strengthening of glass articles can assist in mitigating breakage. Glass articles can be strengthened using a variety of techniques, including chemical and thermal tempering. For example, chemical tempering, sometimes called ion-exchange strengthening, can be used to strengthen glass articles through the introduction of a layer of compressive stress in the surface of the glass articles. The compressive stress is introduced by submerging the glass articles in a molten salt bath, sometimes referred to as an ion-exchange bath. As relatively small ions in the glass are replaced by relatively larger ions from the molten salt, a compressive stress is induced in the surface of the glass. During chemical tempering, glass articles, such as glass containers, may be mechanically manipulated to both fill and empty the glass articles of molten salt.

While chemical tempering improves the strength of the glass articles, mechanical manipulation of the glass articles during the strengthening process may introduce flaws in the surface of the glass. For example, contact between the glass articles and the fixturing, such as a magazine apparatus used to retain the glass articles during processing, may introduce flaws in the glass, particularly when the glass articles and the fixturing are initially submerged in the molten salt bath and/or when the fixturing and glass articles are withdrawn from the molten salt bath and rotated to empty the glass articles of molten salt. Specifically, as the glass articles are submerged they may be buoyant and thus be propelled upward relative to the fixturing. Moreover, after the ion-exchange process is complete, the fixturing and glass articles are withdrawn from the molten salt bath and the fixturing is rotated to empty the glass articles of molten salt contained within the interior volume of the glass articles. As the fixturing is rotated, the glass articles may abruptly collide with the fixturing. This blunt force impact between the glass articles and the fixturing may introduce flaws in the surface of the glass.

In most cases the flaws are superficial and are contained within the layer of surface compressive stress induced in the glass. This surface compressive stress prevents the flaws from growing into cracks. However, in extreme cases, the flaws may extend through the layer of surface compressive stress which may lead to breakage of the glass articles. In either case, the flaws may be visible to the unaided human eye and, as such, are undesirable.

The conveyor apparatuses for holding and conveying glass articles during processing described herein generally mitigate the introduction of flaws in the glass articles retained therein and limit the introduction of flaws to locations of the glass article which are less susceptible to breakage. The conveyor apparatuses with the conveyor ribbons described herein also have a relatively low thermal mass and surface area which mitigates the degradation of ion-exchange performance when the conveyor apparatuses are used to facilitate strengthening of the glass articles contained therein by ion-exchange.

Figure 6:
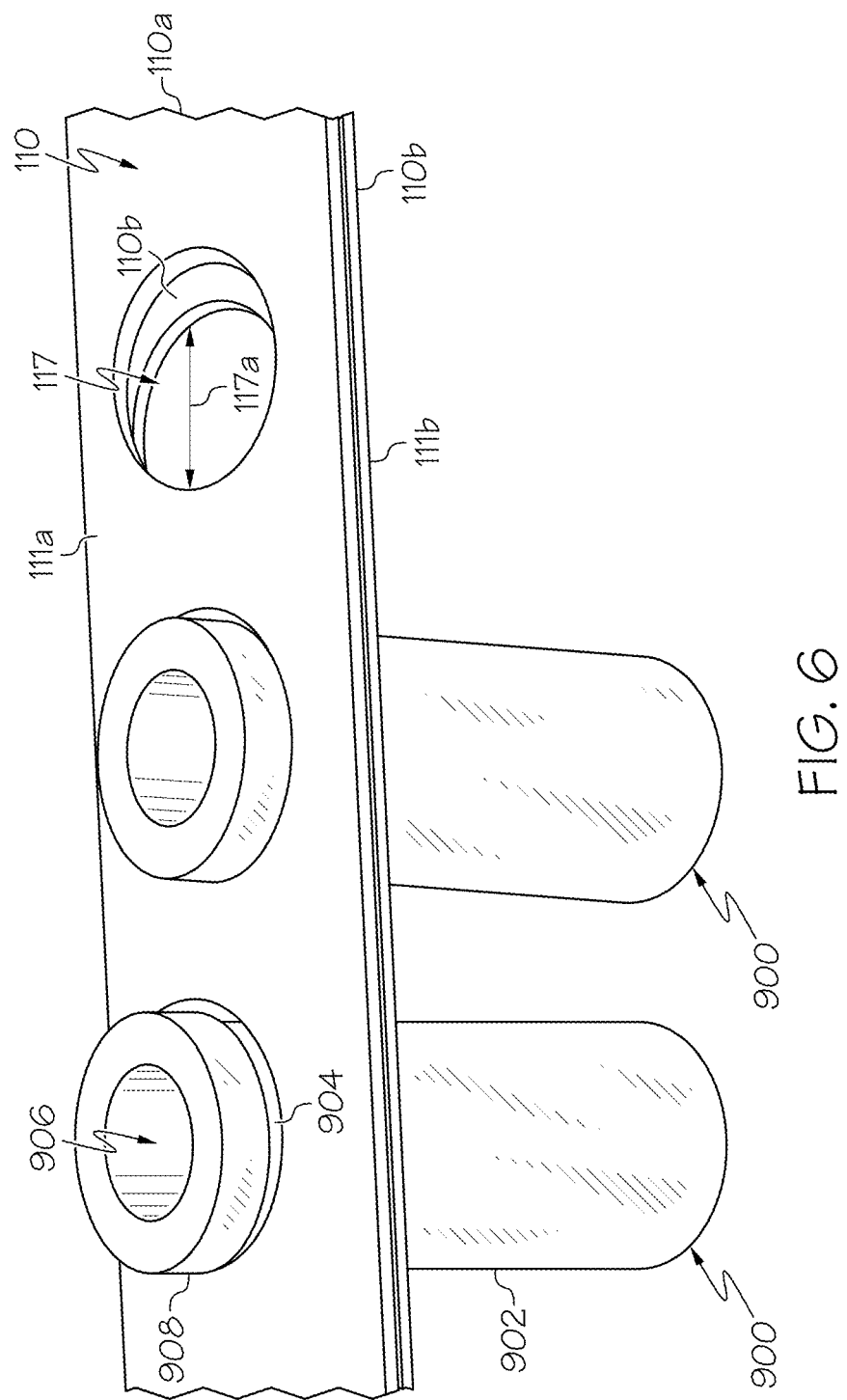
FIG. 6 schematically depicts a perspective view of a conveyor ribbon, according to one or more embodiments shown and described herein.

With reference again to FIG. 1, a conveyor apparatus 100 with a conveyor ribbon 110 holding a plurality of articles 900 is depicted. The conveyor apparatus 100 includes a drive and guidance system 200 (FIGS. 13A and 13B) with a plurality of rollers 210 that direct the conveyor ribbon 110 along a predetermined processing path 10. For example, the conveyor ribbon 110 can be directed to a loading station 102 where a plurality of articles 900 are loaded into the conveyor ribbon 110 (FIGS. 2-8). For example, the conveyor ribbon may include a top ribbon with apertures and a bottom ribbon with apertures (as depicted in FIGS. 4-6) that are temporarily shifted relative to each other such that the top ribbon apertures align with the bottom ribbon apertures thereby allowing a portion of an article 900 to pass through the top ribbon and bottom ribbon. The top ribbon is then returned to its original position relative to the bottom ribbon such that the top ribbon apertures are offset from the bottom ribbon apertures with a portion of a glass article positioned and held above the top ribbon and another portion of the glass article positioned and held below the bottom ribbon. The conveyor ribbon 110 with the plurality of articles 900 can be directed through a first turn 180a and down into an immersion tank 300 containing liquid 302 by moving on first vertical (along Z axis) section 182a of the processing path 10. The conveyor ribbon 110 with the plurality of articles is directed through a second turn 180b of the processing path 10, proceeds along a horizontal (along X or Y axis) section 184 of the processing path 10, and is directed through a third turn 180c before moving up a second vertical section 182b of the processing path 10 and exiting the immersion tank 300. After exiting the immersion tank 300, the conveyor ribbon 110 with the plurality of glass articles proceeds through a drain section 190 where the articles 900 are rotated about a horizontal axis 192 such that liquid 302 within an interior 910 (FIG. 3) or an exterior of the articles 900 can drain. In the embodiment depicted in FIG. 1, the processing path 10 through the drain section 190 is in the form of a loop to facilitate rotating the articles 900 about the horizontal axis 192 and thereby draining the liquid 302 from the interior 910 or exterior of the articles 900.

The conveyor ribbon 110 and the plurality of articles 900 then proceed to an unloading station 104 where the articles 900 are removed from the conveyor ribbon 110 before the conveyor ribbon travels back to the loading station 102 where additional articles 900 are loaded into the conveyor ribbon 110. For example, the conveyor ribbon 110 may have a top ribbon with apertures and a bottom ribbon with apertures as mentioned above and the top ribbon can is temporarily shifted relative to the bottom ribbon such that the top ribbon apertures align with the bottom ribbon apertures. Full alignment of the top ribbon apertures with the bottom ribbon apertures allows the glass article to be released, i.e., to pass back through the top ribbon and bottom ribbon. The conveyor ribbon 110 with the plurality of articles 900 can be directed through additional stations, e.g. a washing station, inspection station, etc., before reaching the unloading station 104. It should be appreciated that the speed of the conveyor ribbon 110 allows for a given article 900 to be located within the immersion tank 300 for a desired amount of time. In embodiments, the articles 900 are glass articles, the immersion tank 300 is an ion-exchange tank and the liquid 302 is a molten salt. In such embodiments, the desired amount of time for a glass article to be immersed in the molten salt can be 1 hour, 2 hours, 4 hours, 8 hours, 12 hours, 24 hours, 36 hours, and any time period between. It should also be appreciated that the turns 180a-180c, vertical sections 182a-182b, etc., shown in FIG. 1 are for illustrative purposes only and any number of turns, vertical sections, inclined sections, horizontal sections, etc., can be used in the conveyor apparatus 100 in order for the plurality of articles 900 to be processed.

Figure 2A:
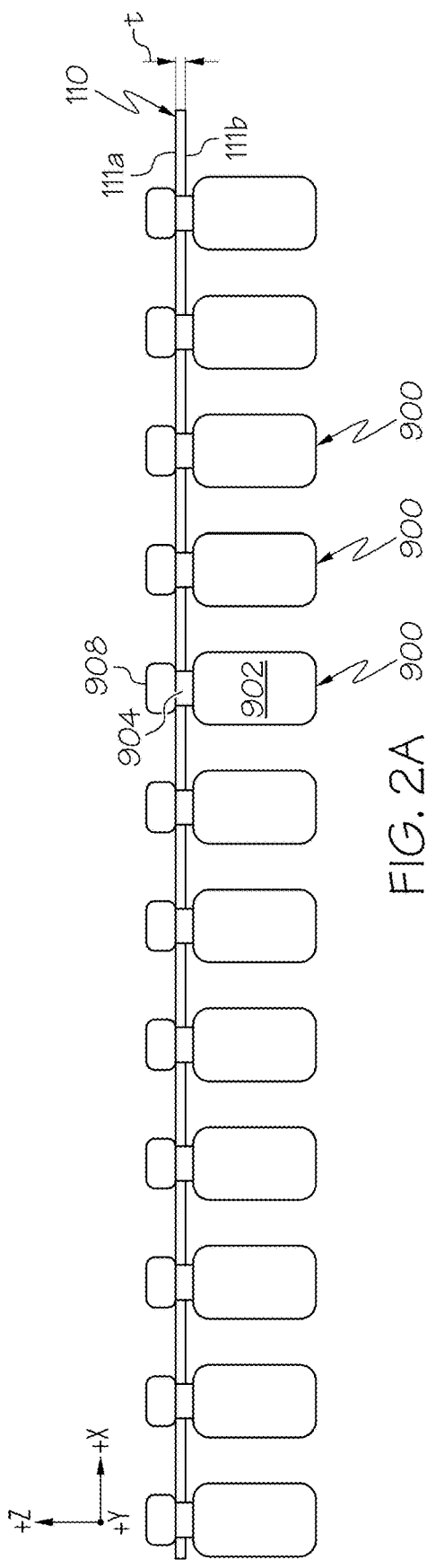
FIG. 2A schematically depicts a side view of a conveyor ribbon, according to one or more embodiments shown and described herein.
Figure 2B:
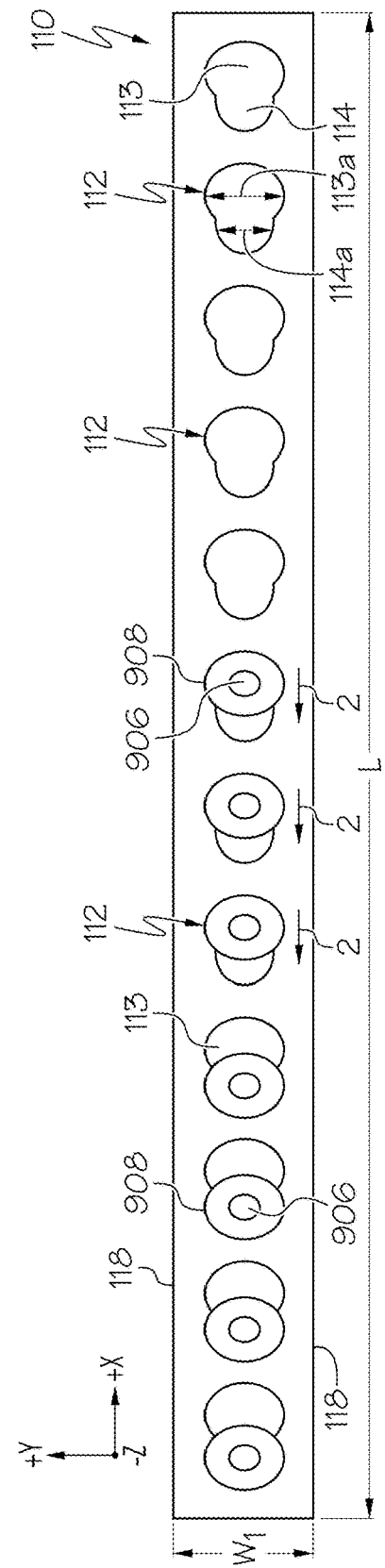
FIG. 2B schematically depicts a top view of a conveyor ribbon, according to one or more embodiments shown and described herein.
Figure 3:
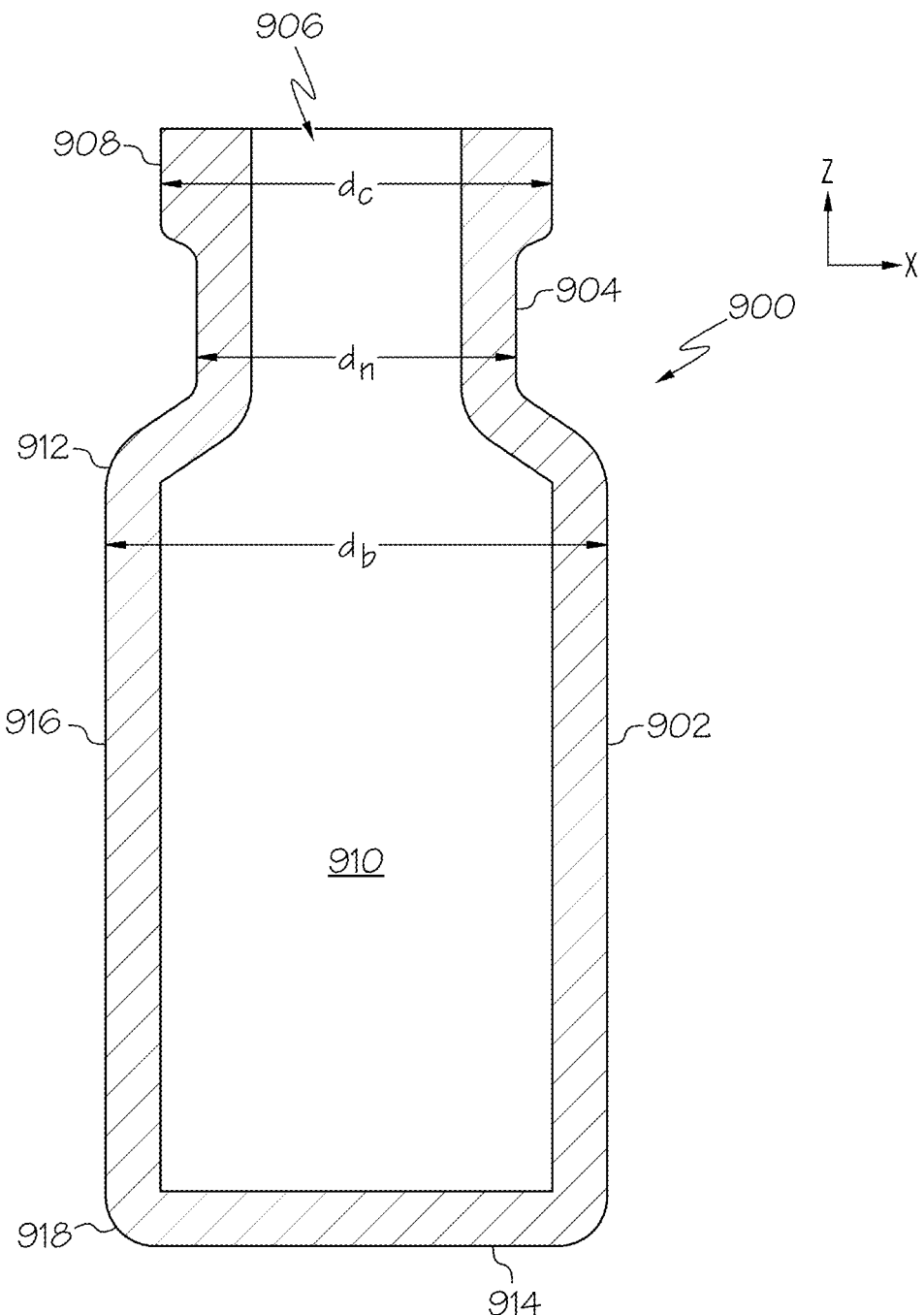
FIG. 3 schematically depicts a cross-sectional view of a glass article, according to one or more embodiments shown and described herein.

Referring now to FIGS. 2A, 2B, and 3, one embodiment of a conveyor ribbon 110 for holding and conveying articles 900 during processing is schematically depicted. The conveyor ribbon 110 is substantially planar and has a top surface 111a, a bottom surface 111b, a width 'W₁', a length 'L', and a thickness 't'. The thickness of the conveyor ribbon can be from about 150 micrometers to about 400 micrometers. The conveyor ribbon 110 holds and retains a plurality of articles 900 in a plurality of apertures 112. Each aperture 112 may be shaped and sized to securely hold articles 900 having a particular form factor, such as round, rectangular, or the like. For example, the apertures 112 of the conveyor ribbon 110 may be shaped to retain round-form glass vials. An example of an article 900 in the form of a glass vial is schematically depicted in FIG. 3. In this embodiment, the article 900 in the shape of a glass vial may generally include a body section 902, a neck section 904 above the body section 902, and an opening 906 leading through the neck section 904 and connected to an interior volume 910. The body section 902 substantially surrounds the interior volume 910 of the article 900 with a bottom section 914 and sidewalls 916. The neck section 904 generally connects the body section 902 with the opening 906. The opening 906 may be surrounded by a collar 908 extending outward from the top of the neck section 904 of the article 900. The body section 902 may have a curved bottom edge 918 and a curved area 912 adjacent the neck section 904. Generally, the neck section 904, body section 902, and collar 908 may have a generally circular shaped cross section, each comprising an exterior diameter. In one embodiment, the diameter of the collar ($d_c$ in FIG. 3) is greater than the diameter of the neck section ($d_n$, in FIG. 3) and the diameter of the body section ($d_b$ in FIG. 3) is greater than the diameter of the collar. The neck section 904 and collar 908 may generally be formed with a greater thickness than the balance of the article 900 and, as such, may be better able to withstand incidental damage, such as scuffing, scratching, or the like, without breakage compared to the balance of the article 900. Accordingly, the conveyor ribbon 110 and apertures 112 are constructed to engage the article 900 in the neck section 904 and collar 908.

In embodiments, the plurality of apertures 112 are in the form of a "keyhole" aperture with a first aperture section 113 and a second aperture section 114. The first aperture section 113 is substantially round in shape and has a first dimension 113a that is greater than the collar diameter $d_c$ and less than the body diameter $d_b$. As such, the collar 908 can slide through the first aperture section 113 but the body section 902 cannot slide through the first aperture section 113. The second aperture section 114 is also substantially round and has a second dimension 114a which is less than the first dimension 113a and the collar diameter $d_c$ but larger than the neck diameter $d_n$. The collar 908 of the article 900 can be passed through the first aperture section 113 of the aperture 112 such that the collar 908 is located above the top surface 111a, the body section 902 is located below the bottom surface 111b, and the neck section 904 is located within the aperture 112. Then, the article 900 can be moved relative to the conveyor ribbon 110 in a direction towards the second aperture section 114 as illustrated by arrows 2 in FIG. 2B. When the neck section 904, with the diameter $d_n$ less than the second dimension 114a, moves from the first aperture section 113 to the second aperture section 114, the edge of the second dimension 114a of the second aperture section 114 prevents the collar 908 from passing back through the aperture 112. In this manner, the article 900 is held by the conveyor ribbon 110 with the collar 908 located above the top side 111a of the conveyor ribbon 110, the body section 902 located below the bottom side 111b of the conveyor ribbon 110 and the neck section 904 located within the second aperture section 114 of the aperture 112. The plurality of articles 900 can be retained in the second aperture section 114 of the apertures 112 using a clip, tab, etc., which ensures that the articles 900 are held and retained by the conveyor ribbon 110 during processing of the articles 900. Illustrative examples of holding and retaining the articles 900 in a reliable and secure manner are discussed below.

Referring now to FIGS. 4A and 4B, another embodiment of a portion of a conveyor ribbon 110 for holding and conveying a plurality of articles 900 is depicted. The conveyor ribbon 110 has a top ribbon 110a and a bottom ribbon 110b. The top ribbon 110a can have a thickness from about 50 micrometers to about 75 micrometers and the bottom ribbon 110b can have a thickness from about 150 micrometers to about 400 micrometers. The top ribbon 110a has a pair of oppositely disposed side edges 118 and the bottom ribbon 110b has a pair of oppositely disposed side edges 119. Both the top ribbon 110a and the bottom ribbon 110b have a plurality of the apertures 112 between the pair of oppositely disposed side edges 118 and 119, respectively, and extending along the length L of the conveyor ribbon 110. The apertures 112 in the top ribbon 110a and the apertures 112 in the bottom ribbon 110b have the first aperture sections 113 and the second aperture sections 114, as described above with respect to FIGS. 2A and 2B. However, the apertures 112 in the bottom ribbon 110b are rotated 180 degrees relative to the apertures 112 in the top ribbon 110a.

The top ribbon 110a and bottom ribbon 110b of the conveyor ribbon 110 are translatable relative to one another in the length direction (along the X-axis) such that the conveyor ribbon 110 has an open position and a lock position. In the open position (not shown), the top ribbon 110a is aligned with and extends over the bottom ribbon 110b with the first aperture sections 113 in the top ribbon 110a aligned directly above (coaxial) with the first aperture sections 113 in the bottom ribbon 110b. In the open position a plurality of apertures having the first dimension 113a extend through the thickness t of the conveyor ribbon 110 (i.e., the apertures extend through both the top ribbon 110a and the bottom ribbon 110b). With the collar diameter $d_c$ being less than the first dimension 113a of the aligned first aperture sections 113, the collar 908 of the articles 900 can slide up through the aligned first aperture sections 113 of the top ribbon 110a and bottom ribbon 110b. In this manner, the articles 900 can be positioned with the collars 908 located above the top surface 111a of the conveyor ribbon 110, the body sections 902 located below the bottom surface 111b of the conveyor ribbon 110, and the neck sections 904 located within the first aperture sections 113 of the top ribbon 110a and bottom ribbon 110b. The conveyor ribbon 110 can be placed in the open position by translating/moving the top ribbon 110a relative to the bottom ribbon 110b, or vice-versa, such that the first aperture sections 113 of the top ribbon 110a are aligned directly above (coaxial) the first aperture sections 113 of the bottom ribbon 110b (not shown). For example, the top ribbon 110a may have a different travel path than the bottom ribbon 110b, the different travel paths of the top ribbon 110a and bottom ribbon 110b providing a temporary shift of the top ribbon 110a relative to the bottom ribbon 110b. The temporary shift of the top ribbon 110a relative to the bottom ribbon 110b aligns the first aperture sections 113 of the top ribbon 110a directly above (coaxial) the first aperture sections 113 of the bottom ribbon 110b. The conveyor ribbon 110 can be placed in the lock position by reversing the temporary shift of the top ribbon 110a relative to the bottom ribbon 110b such that the second aperture sections 114 of the top ribbon 110a are aligned directly above (coaxial) the second aperture sections 114 of the bottom ribbon 110b (FIG. 4B). Movement of the top ribbon 110a relative to the bottom ribbon 110b to reverse the temporary shift moves the neck sections 904 of the articles 900 from the first aperture sections 113 of the top ribbon 110a and the bottom ribbon 110b to the aligned second aperture sections 114 of the top ribbon 110a and bottom ribbon 110b. The alignment of the second aperture sections 114 of the top ribbon 110a with the second aperture sections 114 of the bottom ribbon 110b provides a plurality of receiving apertures 115 with a retaining dimension 115a. In the embodiment depicted in FIG. 4B, the retaining dimension 115a is equal to the second dimension 114a. However, in other embodiments, the retaining dimension 115a may not be equal to the second dimension 114a so long as the collars 908 of the plurality of articles 900 cannot slide back through the receiving apertures 115 while the conveyor ribbon 110 is in the lock position. For example, the receiving apertures 115 can be elliptical in shape with the retaining dimension 115a being less than or greater than the second dimension 114a.

Referring now to FIGS. 5A and 5B, another embodiment of a portion of a conveyor ribbon 110 for holding and conveying a plurality of articles 900 is depicted. The conveyor ribbon 110 is similar to the conveyor ribbon depicted in FIGS. 4A and 4B, except the top ribbon 110a is translatable relative to the bottom ribbon 110b along a width direction (along the Y-axis) of the conveyor ribbon 110. The conveyor ribbon 110 includes the top ribbon 110a and the bottom ribbon 110b. The top ribbon 110a can have a thickness from about 50 micrometers to about 75 micrometers and the bottom ribbon 110b can have a thickness from about 150 micrometers to about 400 micrometers. The top ribbon 110a has a pair of oppositely disposed side edges 118 and the bottom ribbon 110b has a pair of oppositely disposed side edges 119. Both the top ribbon 110a and the bottom ribbon 110b have a plurality of the apertures 112 between the pair of oppositely disposed side edges 118 and 119, respectively, and extending along the length L of the conveyor ribbon 110. The apertures 112 in the top ribbon 110a and the apertures 112 in the bottom ribbon 110b have the first aperture sections 113 and the second aperture sections 114, as described above with respect to FIGS. 4A and 4B. However, the apertures 112 in the bottom ribbon 110b and the apertures 112 in the top ribbon 110a are arranged at 90 degrees relative to the apertures 12 in FIGS. 4A and 4B.

The top ribbon 110a and bottom ribbon 110b of the conveyor ribbon 110 are translatable relative to one another in the width direction (along the Y-axis) such that the conveyor ribbon 110 has an open position and a lock position. In the open position (not shown), the top ribbon 110a is aligned with and extends over the bottom ribbon 110b with the first aperture sections 113 in the top ribbon 110a aligned directly above the first aperture sections 113 in the bottom ribbon 110b. In the open position a plurality of apertures having the first dimension 113a extend through the thickness t of the conveyor ribbon 110 (i.e., the apertures extend through both the top ribbon 110a and the bottom ribbon 110b). With the collar diameter $d_c$ being less than the first dimension 113a of the aligned first aperture sections 113, the collar 908 of the articles 900 can slide up through the aligned first aperture sections 113 of the top ribbon 110a and bottom ribbon 110b. In this manner, the articles 900 can be positioned with the collars 908 located above the top surface 111a of the conveyor ribbon 110, the body sections 902 located below the bottom surface 111b of the conveyor ribbon 110, and the neck sections 904 located within the first aperture sections 113 of the top ribbon 110a and bottom ribbon 110b. The conveyor ribbon 110 can be placed in the open position by translating/moving the top ribbon 110a relative to the bottom ribbon 110b in the width direction (along the Y-axis), or vice-versa, such that the first aperture sections 113 of the top ribbon 110a are aligned directly above the first aperture sections 113 of the bottom ribbon 110b (not shown). For example, the top ribbon 110a may have a different travel path than the bottom ribbon 110b, the different travel paths of the top ribbon 110a and bottom ribbon 110b providing a temporary shift of the top ribbon 110a relative to the bottom ribbon 110b. The temporary shift of the top ribbon 110a relative to the bottom ribbon 110b aligns the first aperture sections 113 of the top ribbon 110a directly above the first aperture sections 113 of the bottom ribbon 110b. The conveyor ribbon 110 can be placed in the lock position by reversing the temporary shift of the top ribbon 110a relative to the bottom ribbon 110b such that the second aperture sections 114 of the top ribbon 110a are aligned directly above the second aperture sections 114 of the bottom ribbon 110b (FIG. 5B). Movement of the top ribbon 110a relative to the bottom ribbon 110b to reverse the temporary shift moves the neck sections 904 of the articles 900 from the first aperture sections 113 of the top ribbon 110a and the bottom ribbon 110b to the aligned second aperture sections 114 of the top ribbon 110a and bottom ribbon 110b. The alignment of the second aperture sections 114 of the top ribbon 110a with the second aperture sections 114 of the bottom ribbon 110b provides a plurality of receiving apertures 115 with a retaining dimension 115a. In the embodiment depicted in FIG. 5B, the retaining dimension 115a is equal to the second dimension 114a. However, in other embodiments, the retaining dimension 115a may not be equal to the second dimension 114a so long as the collars 908 of the plurality of articles 900 cannot slide back through the receiving apertures 115 while the conveyor ribbon 110 is in the lock position. For example, the receiving apertures 115 can be elliptical in shape with the retaining dimension 115a being less than or greater than the second dimension 114a.

Referring now to FIGS. 5C, 5D and 6, another embodiment of a conveyor ribbon 110 to hold and convey a plurality of articles 900 is depicted. The conveyor ribbon 110 has the top ribbon 110a and the bottom ribbon 110b. The top ribbon 110a and the bottom ribbon 110b both have apertures 116 extending along their length. The apertures 116 are circular in form and each aperture 116 has a diameter 116a. The diameter 116a is greater than the collar diameter $d_c$ and less than the body diameter $d_b$.

The conveyor ribbon 110 with apertures 116 in the top ribbon 110a and bottom ribbon 110b has an open position and a lock position. In the open position (not shown), the apertures 116 of the top ribbon 110a are aligned directly above (coaxial) the apertures 116 of the bottom ribbon 110b. The conveyor ribbon 110 can be placed in the open position by translating/moving the top ribbon 110a relative to the bottom ribbon 110b in the length direction (along the X-axis) or along the width direction (along the Y-axis), or vice-versa, such that the apertures 116 of the top ribbon 110a are aligned directly above (coaxial) the apertures 116 of the bottom ribbon 110b (not shown). For example, the top ribbon 110a may have a different travel path than the bottom ribbon 110b, the different paths of the top ribbon 110a and bottom ribbon 110b providing a temporary shift of the top ribbon 110a relative to the bottom ribbon 110b. The temporary shift of the top ribbon 110a relative to the bottom ribbon 110b aligns the apertures 116 of the top ribbon 110a directly above the apertures 116 of the bottom ribbon 110b. With the apertures 116 of the top ribbon 110a and bottom ribbon 100b so aligned, the collars 908 of the articles 900 can slide up and through the aligned apertures 116 such that the collars 908 are located above the top surface 111a of the conveyor ribbon 110, the body sections 902 are located below the bottom surface 111b of the conveyor ribbon 110, and the neck sections 904 are located within the aligned apertures 116 of the top ribbon 110a and bottom ribbon 110b. The conveyor ribbon 110 can be placed in the lock position by reversing the temporary shift of the top ribbon 110a relative to the bottom ribbon 110b such that the openings provided by the aligned apertures 116 are reduced to receiving apertures 117 with retaining dimensions 117a (FIG. 5D). The retaining dimension 117a is less than the collar diameter $d_c$, greater than the neck section diameter $d_n$ and less than the body section diameter $d_b$. Thus, as illustrated in FIG. 6, articles 900 are held and secured by the conveyor ribbon 110 with the top ribbon 110a shifted relative to the bottom ribbon 110b such that receiving apertures 117 with retaining dimensions 117a are provided and the collar 908 is located above the top surface 111a and the body section 902 is located below the bottom surface 111b of the conveyor ribbon 110.

Figure 7A:
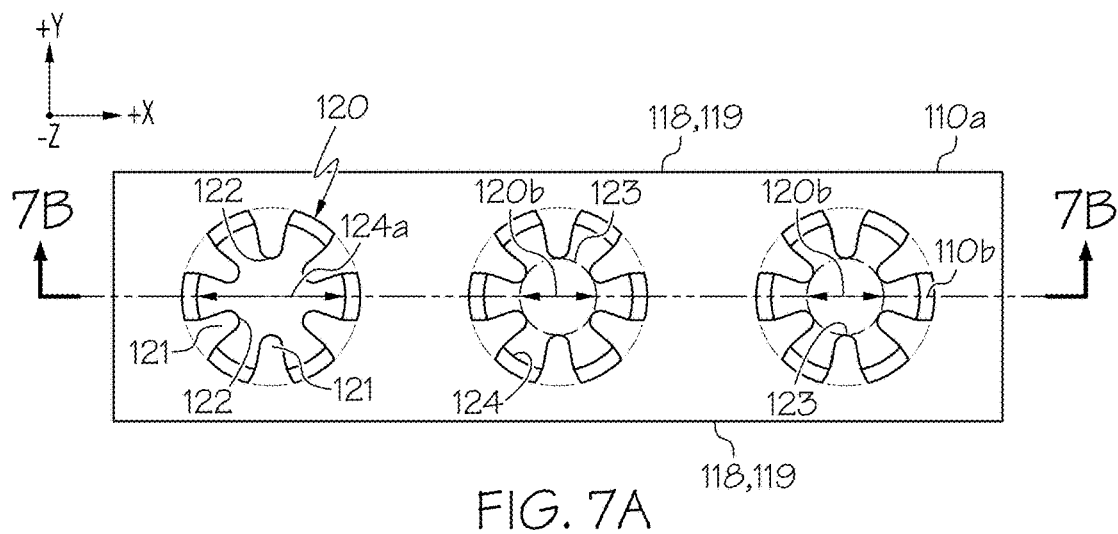
FIG. 7A schematically depicts a top view of a conveyor ribbon, according to one or more embodiments shown and described herein.
Figure 7B:
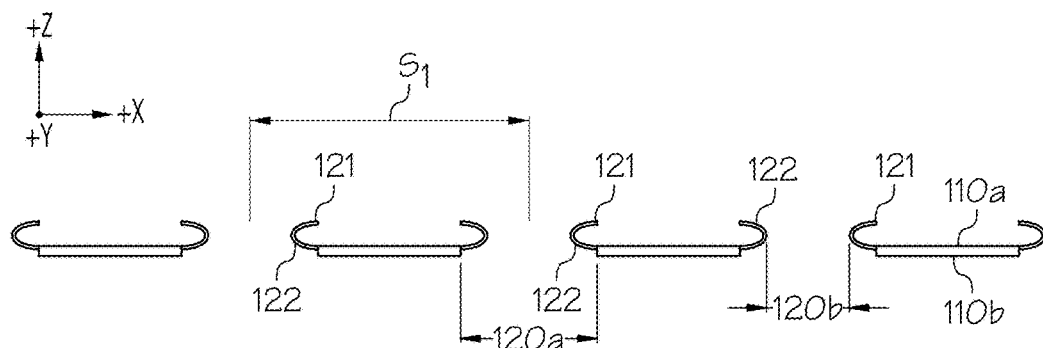
FIG. 7B schematically depicts a side view of a conveyor ribbon, according to one or more embodiments shown and described herein.
Figure 7C:
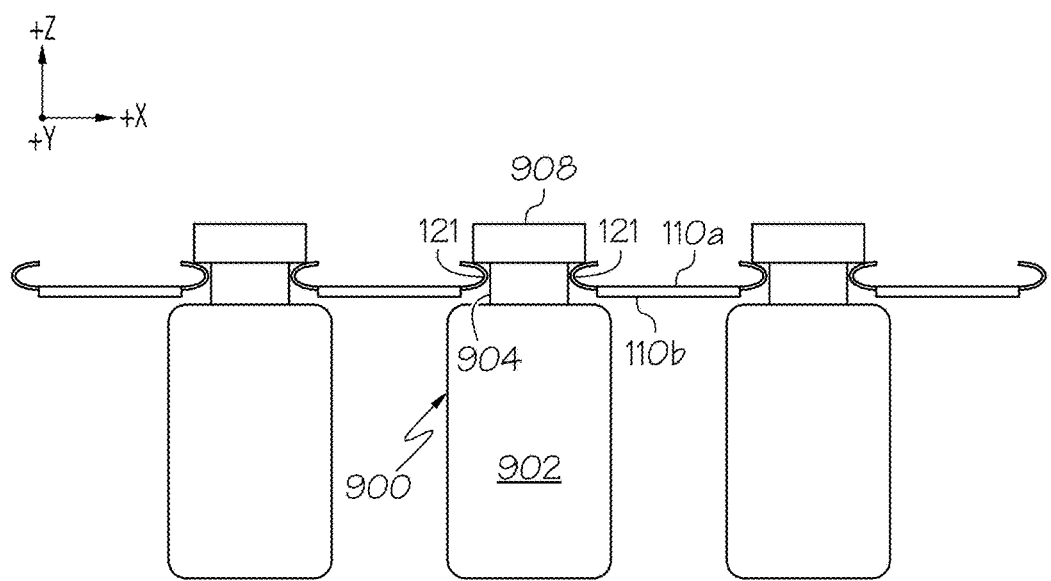
FIG. 7C schematically depicts a side view of a conveyor ribbon, according to one or more embodiments shown and described herein.

Referring now to FIGS. 7A, 7B and 7C, another embodiment of the conveyor ribbon 110 is depicted. The conveyor ribbon 110 has a top ribbon 110a, a bottom ribbon 110b and a plurality of receiving apertures 120. Each receiving aperture 120 has a circular aperture 124 with an outer diameter 124a within the bottom ribbon 110b. The outer diameter 124a is greater than the collar diameter $d_c$, greater than the neck section diameter $d_n$ and less than the body section diameter $d_b$, i.e. the outer diameter 124a allows for the articles 900 to be received into the conveyor ribbon 110. Each receiving aperture 120 also has at least one tab 121 from the top ribbon 110a extending inwardly towards a center axis (not shown) of the circular aperture 124. The bottom ribbon 110b may have thickness from about 50 micrometers to about 75 micrometers and the bottom ribbon 110b may have a thickness from about 150 micrometers to about 400 micrometers. The relatively thin top ribbon 110a allows for the at least one tab 121 to elastically deform and serve as a retainer feature. In the embodiment depicted in FIG. 7A, a plurality of tabs 121 from the top ribbon 110a extend inwardly towards the center axis of the circular aperture 124 and each of the tabs 121 have a distal end 122. The distal ends 122 of the plurality of tabs 121 define a generally circular opening having an inner diameter 120b which is less than the collar diameter $d_c$. The openings between the distal ends 122 of the tabs 121 with the inner diameter 120b allow for the collars 908 of glass articles to elastically deform the tabs 121 and serve as retainer features when the collars 908 are pushed through the openings such that the collars 908 of the articles 900 are located above the top surface 111a, the body sections 902 are located below the bottom surface 111b and the neck sections 904 are located between the tabs 121 of the conveyor ribbon 110, i.e. the tabs 121 allow for the articles 900 to be received and retained within the conveyor ribbon 110. FIGS. 7A, 7B and 7C depict the conveyor ribbon 110 having the top ribbon 110a with the tabs 121. However, in other embodiments (not shown), a top ribbon is not required and the receiving apertures 120 and the tabs 121 can be formed from of a single ribbon. In the alternative, the tabs 121 can be separate components that are joined to a single ribbon containing the receiving apertures 120 such that the tabs 121 extend inwardly towards a central axis of the receiving apertures 120 and provide an opening with a diameter that is less than the collar diameter $d_c$.

Figure 8:
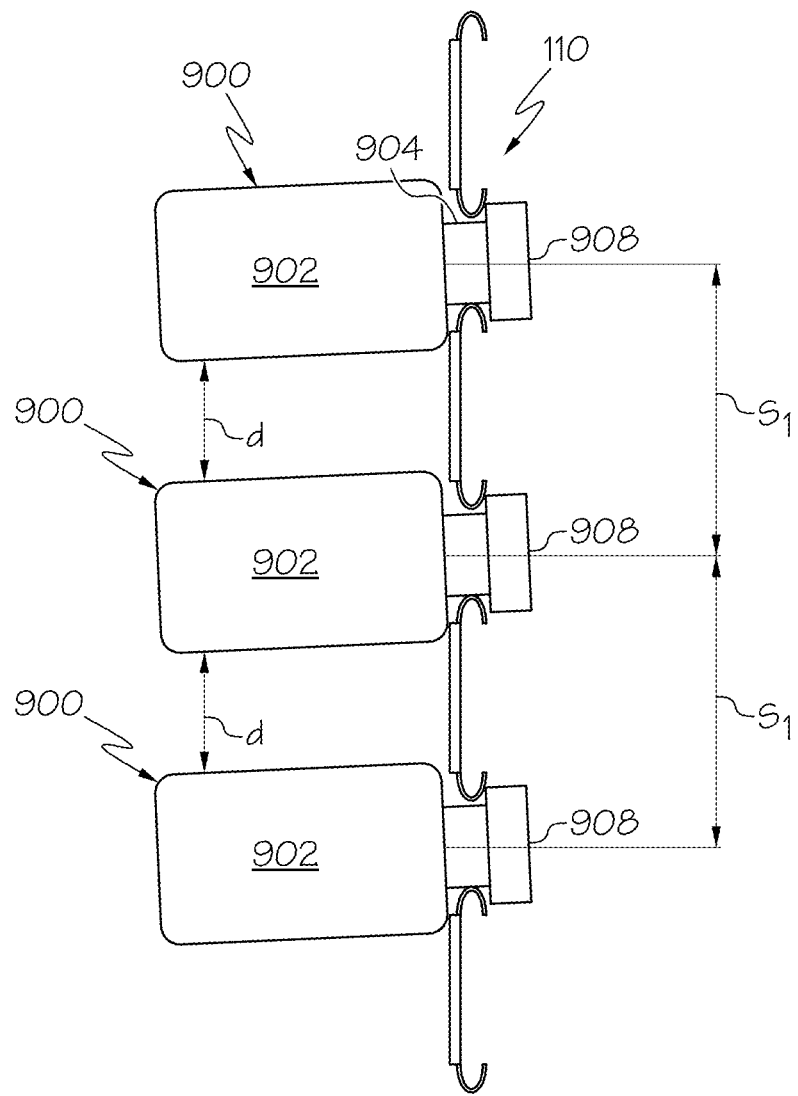
FIG. 8 schematically depicts a side view of a conveyor ribbon, according to one or more embodiments shown and described herein.

Referring to FIG. 8, the spacing between adjacent receiving apertures 120 (S1 in FIGS. 7B and 8) is such that adjacent articles 900 do not contact each other when the conveyor ribbon 110 is inclined, e.g. in a vertical orientation. The spacing S1 results in a minimum distance (d in FIG. 8) to be maintained between adjacent articles 900 during processing of the articles 900. It should be appreciated that the spacing S1 between adjacent receiving apertures 120 and the minimum distance d between adjacent articles 900 depicted for the conveyor ribbon 110 can also be present for the conveyor ribbon 110 with the apertures 112 (FIG. 2B) and the conveyor ribbon with the apertures 116 (FIG. 5C).

Figure 9:
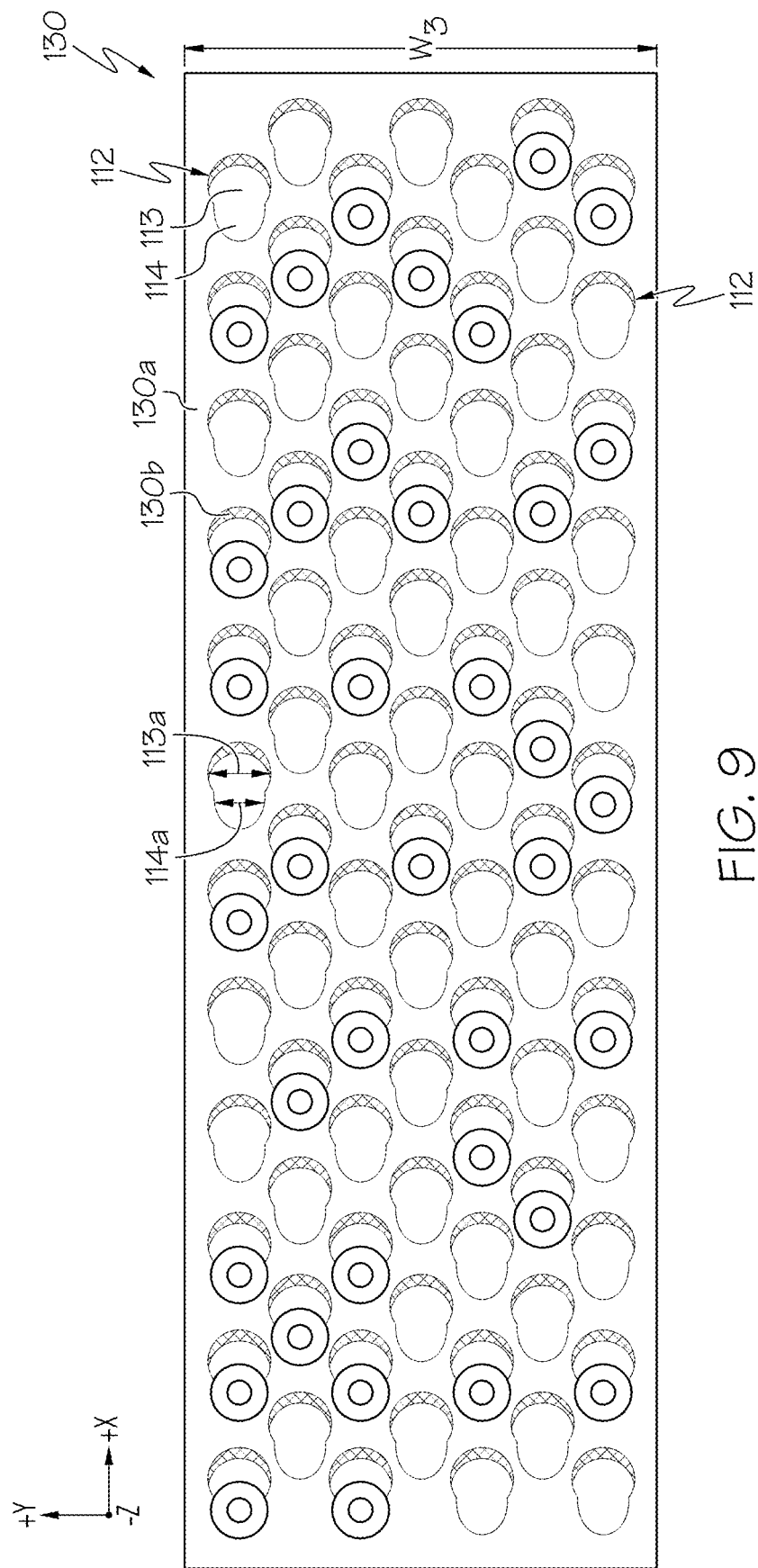
FIG. 9 schematically depicts a top view of a conveyor ribbon, according to one or more embodiments shown and described herein.

Referring now to FIG. 9, a conveyor ribbon 130 is shown with a width '$W_3$.' The width $W_3$ is sufficient for a plurality of apertures 112 to be formed through the conveyor ribbon 130 along the width $W_3$. The apertures 112 shown in FIG.

9 have the first aperture section 113 and the second aperture section 114 as depicted in FIG. 4A. However, it should be appreciated that the conveyor ribbon 130 with the width $W_3$ can have the circular apertures 116 as illustrated in FIGS. 5C and 5D. In addition, it should also be appreciated that the conveyor ribbon 130 can have a top ribbon 130a and a bottom ribbon 130b such that apertures 112 or apertures 116 can be aligned to provide the receiving apertures 115 or receiving apertures 117 as discussed above with reference to FIGS. 4A-6.

Figure 10:
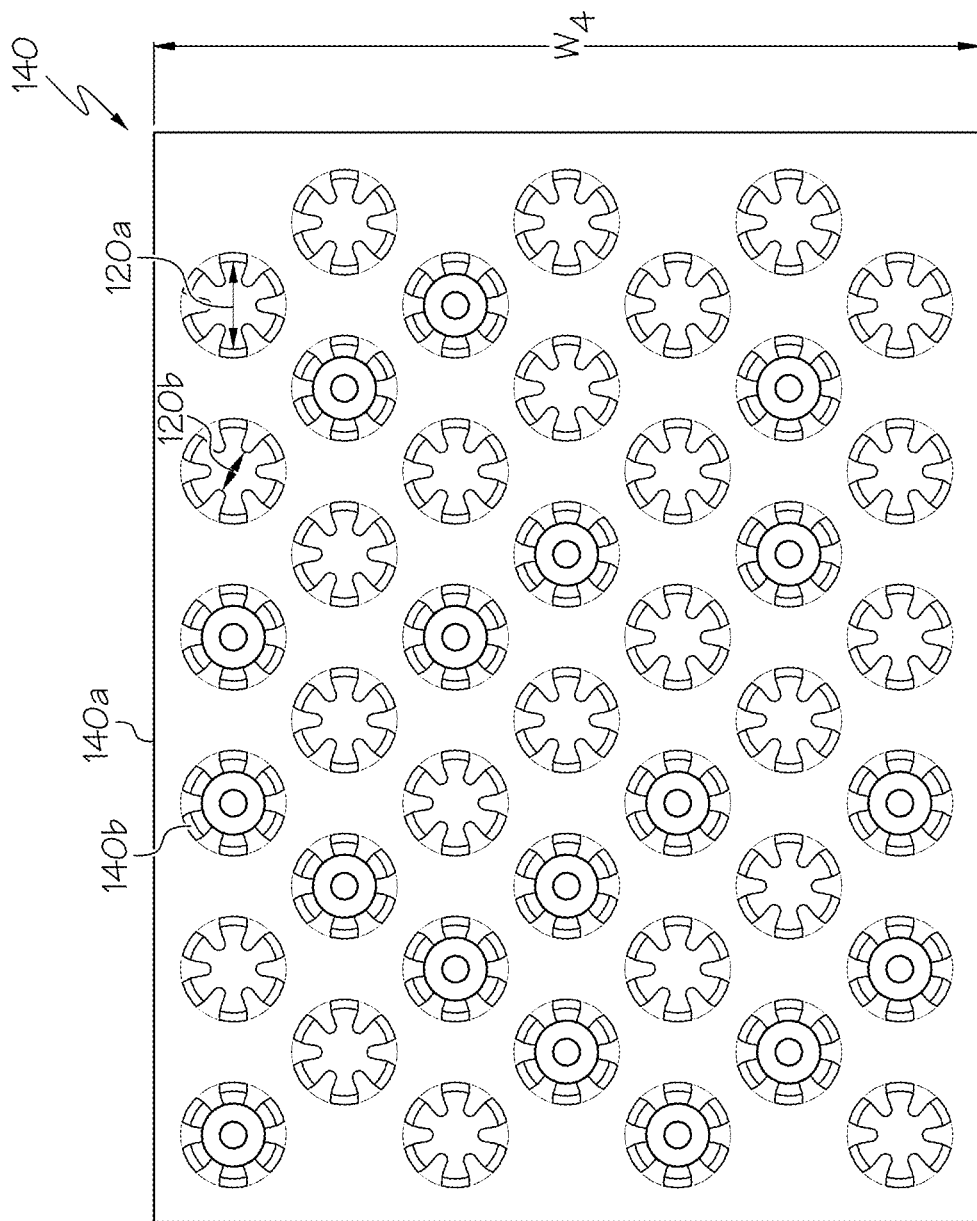
FIG. 10 schematically depicts a top view of a conveyor ribbon, according to one or more embodiments shown and described herein.

With reference to FIG. 10, a conveyor ribbon 140 has a width $W_4$, the width $W_4$ allowing for a plurality of receiving apertures 120 to extend along the width $W_3$ of the conveyor ribbon 140. It should be appreciated that the conveyor ribbon 140 can have a top ribbon 140a and a bottom ribbon 140b. In this manner, conveyor ribbons disclosed herein can hold and convey a plurality of articles 900 along the length of the conveyor ribbon or along the length and the width of the conveyor ribbon. It should be appreciated that all of the apertures 112 in FIG. 9 and receiving apertures 120 in FIG. 10 can have an article 900 held therein. The conveyor ribbons 130 or 140 can have a thickness from about 150 micrometers to about 400 micrometers. The top ribbons 130a, 140a can have a thickness from about 50 micrometers to about 75 micrometers and the bottom ribbons 130b, 140b can have a thickness from about 150 micrometers to about 400 micrometers.

Figure 11:
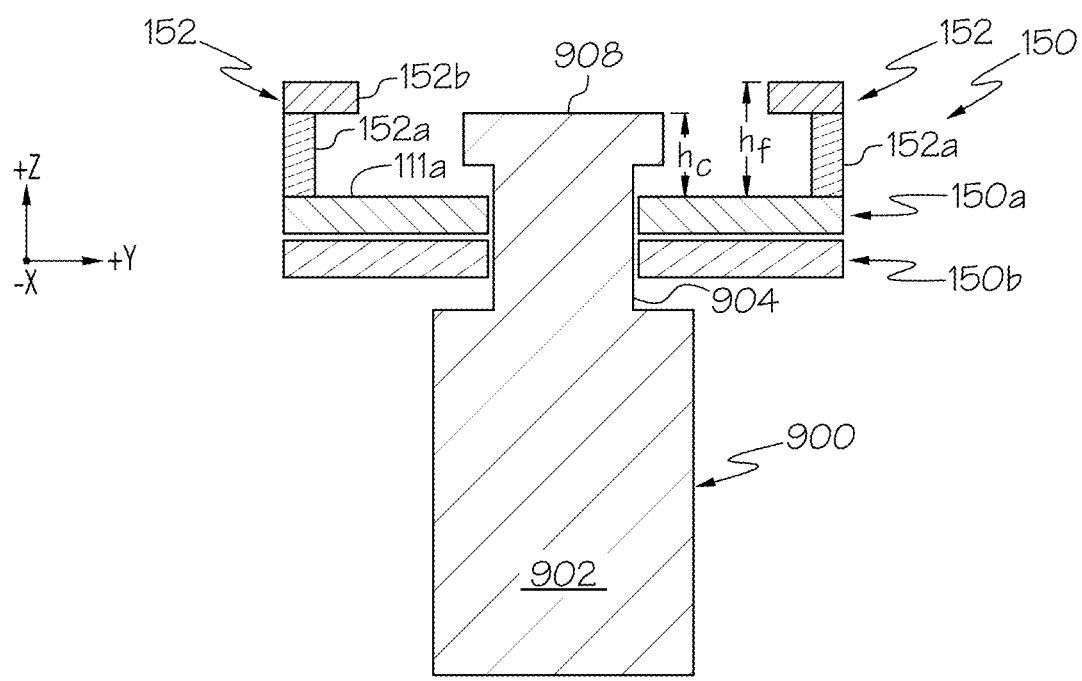
FIG. 11 schematically depicts an end view of a conveyor ribbon, according to one or more embodiments shown and described herein.

With reference now to FIG. 11, a conveyor ribbon 150 is depicted with a flange 152 that protects the collar 908 of a glass article during processing. The conveyor ribbon 150 has a top ribbon 150a and a bottom ribbon 150b. The top ribbon 150a can have a thickness from about 50 micrometers to about 75 micrometers and the bottom ribbon 150b can have a thickness from about 150 micrometers to about 400 micrometers. The top ribbon 150a has a pair of flanges 152. Each flange 152 has a first section 152a extending from a top surface 111a of the top ribbon 150a and a second section 152b extending from the first section 152a. In FIG. 11 the first section 152a is depicted as vertical and the second section 152b is depicted as horizontal. Other flange configurations can be used so long as the height of the flange 152 (flange height=$h_f$ in FIG. 11) is greater than the height of the collar 908 (collar height=$h_c$ in FIG. 11) that extends above the top surface 111a. Also, the flange 152 can be part of the conveyor ribbon 110 (FIGS. 2-8), conveyor ribbon 130 (FIG. 9) and conveyor ribbon 140 (FIG. 10) such that collars 908 of glass articles held in the conveyor ribbons are protected from contact with processing equipment.

The apertures, tabs and flanges of the conveyor ribbons disclosed herein can be formed in or on a conveyor ribbon using conventional manufacturing techniques. For example, apertures, with and without tabs, in the conveyor ribbons can be formed by stamping, laser cutting, water jet cutting and the like. Tabs can be formed by stamping, laser cutting, water jet cutting, etc. Flanges can be integral with the ribbon and formed by a folding shear. In the alternative, flanges can be formed by stamping, laser cutting, water jet cutting, etc. and welded to the ribbon. The conveyor ribbon can be made from a metallic material that exhibits salt corrosion resistance, for example, Inconel 600, Hastelloy, 310 stainless steel, etc. It should be appreciated that the conveyor ribbons disclosed herein can have a thickness that provides a large glass weight to conveyer ribbon weight ratio (weight of glass/conveyer ribbon used to hold and retain glass during ion-exchange processing) compared to conventional ion-exchange processing equipment. For example, conveyor ribbons disclosed herein can provide a glass weight to glass handling equipment weight ratio of between 0.4-1.0, whereas conventional ion-exchange processing equipment provides a glass weight to glass handling equipment weight ratio of between 0.0001-0.001. Thicknesses of conveyor ribbons disclosed herein provide sufficient rigidity to bear the weight of glass articles held in the conveyor ribbons during processed and yet accommodate 120-150 millimeter (mm) radius turns along the processing path. In embodiments, thicknesses of conveyor ribbons range from 250-350 μm when a single conveyor ribbon is used to hold glass articles during processing. In other embodiments when a top conveyor ribbon and a bottom conveyor ribbon are used to hold glass articles during processing, the top conveyor ribbon has a thickness between 50-75 μm and the bottom conveyor ribbon has a thickness between 200-300 μm. It should be appreciated that larger glass to glass handling equipment weight ratios provided by the conveyor apparatuses with conveyor ribbons disclosed herein results in less volume and mass of glass handling equipment that must be heated in a pre-heat furnace or ion-exchange tank. Therefore, the conveyor apparatuses disclosed herein can provide increased energy efficiency in the ion-exchange process.

Referring now to FIGS. 12A and 12B, an embodiment of a drive and guidance system 200 that drives and guides the conveyor ribbon 110 is depicted. The drive and guidance system 200 includes a pair of rollers 210 spaced apart from one another on opposite sides of the conveyor ribbon 110. Each of the rollers 210 can have an inner roller portion 212 having a radius $r_1$ and an outer surface 213. Each of the rollers 210 also has a pair of spaced apart outer roller portions 214 having a radius $r_2$ and an outer surface 215. The radius $r_2$ is greater than the radius $r_1$. The inner roller portion 212 is disposed between the pair of spaced apart outer roller portions 214. A channel 216 is located between the pair of spaced apart outer roller portions 214. The outer surface 213 of the inner roller portion 212 is a side wall of the channel 216. The conveyor ribbon 110 may be positioned between pairs of opposing rollers 210 such that the side edges 118, 119 are positioned between the pair of spaced apart outer roller portions 214 and in contact with the outer surface 213 of the inner roller portion 212. One or more of the pairs of oppositely disposed rollers 210 (FIG. 1) can be actively driven/rotated by a mechanical device (not shown) such as an electric motor. Also, one or more of the pairs of oppositely disposed rollers 210 can be free to rotate (i.e., not actively driven by a mechanical device) as the conveyor ribbon 110 passes through the rollers 210. When the pair of oppositely disposed rollers 210 rotate as illustrated by the arrows 6 in FIG. 12A, friction between the oppositely disposed side edges 118, 119 of the conveyor ribbon 110 and the outer surfaces 213 of the pair of oppositely disposed inner roller portions 212 results in a force being applied to the conveyor ribbon 110 thereby propelling the conveyor ribbon in a direction as illustrated by the arrow 220. Through the use of a plurality of pairs of oppositely disposed rollers 210, the drive and guidance system 200 drives the conveyor ribbon 110 in a desired direction and guides the conveyor ribbon along a desired path. For example, a plurality of oppositely disposed rollers 210 can drive the conveyor ribbon 110 along the predetermined processing path 10 as depicted in FIG. 1. FIGS. 12A and 12B depict the drive and guidance system 200 having rollers 210 that drive the top ribbon 110a and the bottom ribbon 110b along the same path. However, in other embodiments (not shown), a drive and guidance system can drive the top ribbon 110a along a slightly different path that then bottom ribbon 110b, or vice-versa. For example, the drive and guidance system 200 may be configured to displace the top ribbon 110a relative to the bottom ribbon 110b in the width direction (along the Y-axis) or in the length direction (along the X-axis). The displacement of the top ribbon 110a relative to the bottom ribbon 110b can provide a temporary shift of the top ribbon 110a relative to the bottom ribbon 110b in the width direction (along the Y-axis) or in the length direction (along the X-axis) as discussed with respect to FIGS. 4-6. The temporary shift of the top ribbon 110a relative to the bottom ribbon 110b can place a portion of the conveyor ribbon 110 in the open position, e.g. during loading of glass articles 900 into the conveyor ribbon 110, and the reversal of the temporary shift of the top ribbon 110a relative to the bottom ribbon 110b can place the portion of the conveyor ribbon 110 in the open position in the lock position, e.g. for conveying glass articles 900 through an immersion tank.

Figure 13:
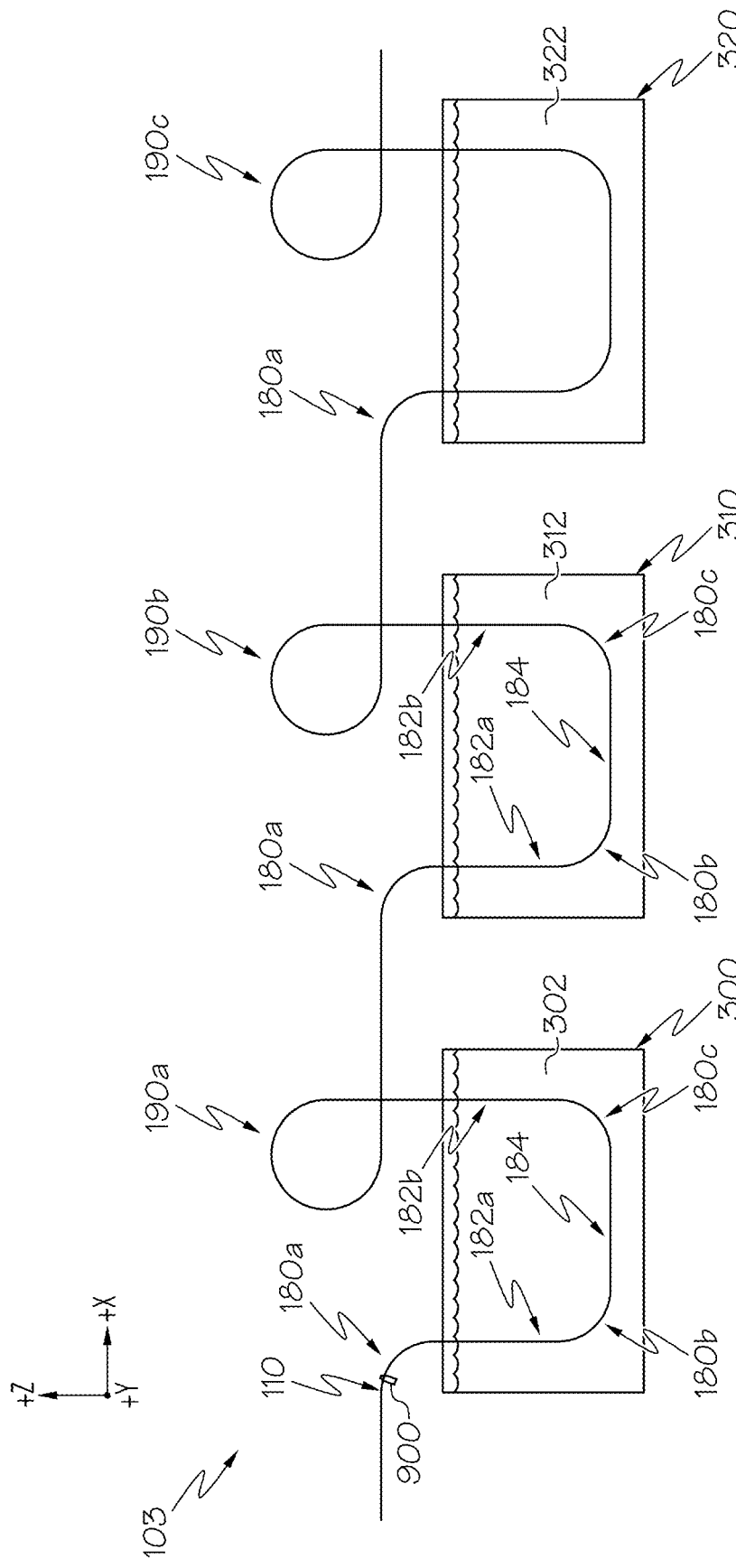
FIG. 13 schematically depicts a conveyor apparatus, according to one or more embodiments shown and described herein.

With reference to FIG. 13, an embodiment of a conveyor apparatus 103 with the conveyor ribbon 110 and drive and guidance system is depicted in conjunction with a plurality of immersion tanks. The conveyor ribbon 110 of the conveyor apparatus 103 extends along a processing path into a first immersion tank 300 containing a first liquid 302. The conveyor ribbon 110 extends along the processing path through the first turn 180a, down into the first liquid 302 along the first vertical section 182a, through the second turn 180b and along the horizontal section 184. After passing through the horizontal section 184, the conveyor ribbon 110 exits the first liquid 302 after the third turn 180c and the second vertical section 182b. After exiting the first liquid 302 and thus the first immersion tank 300, the conveyor ribbon 110 passes through a first drain section 190a and then proceeds to a second immersion tank 310 containing a second liquid 312.

Upon reaching the second immersion tank 310, the conveyor ribbon 110 with the plurality of articles 900 extends along the processing path through another first turn 180a, down into the second liquid 312 along another first vertical section 182a, through another second turn 180b and along another horizontal section 184 in the second immersion tank 310. After passing through the horizontal section 184, the conveyor ribbon 110 exits the second liquid 312 after the third turn 180c and second vertical section 182b. After exiting the second liquid 312 and thus the second immersion tank 310, the conveyor ribbon 110 passes through a second drain section 190b and then proceeds to a third immersion tank 320 containing a third liquid 322.

Upon reaching the third immersion tank 320, the conveyor ribbon 110 with the plurality of articles 900 extends along the processing path through another first turn 180a, down into the third liquid 322 along another first vertical section 182a, through another second turn 180b and along another horizontal section 184 in the third immersion tank 320. After passing through the horizontal section 184, the conveyor ribbon 110 exits the third liquid 322 after the third turn 180c and second vertical section 182b. After exiting the third liquid 322 and thus the third immersion tank 320, the conveyor ribbon 110 passes through a third drain section 190c and then proceeds to an unloading station (not shown).

The first liquid 302, second liquid 312 and third liquid 322 can be molten salts that have the same salt composition. In the alternative, the first liquid 302, second liquid 312 and third liquid 322 can be molten salts that have different salt compositions. It should be appreciated that the first immersion tank 300, second immersion tank 310 and third immersion tank 320 can be dimensioned such that articles 900 spend a predetermined amount of time in each immersion tank. For example, the first immersion tank 300, second immersion tank 310 and third immersion tank 320 can be dimensioned such that articles 900 spend the same amount of time in each immersion tank bath. In the alternative, the first immersion tank 300, second immersion tank 310 and third immersion tank 320 can be dimensioned such that glass articles spend different amounts of time in each immersion tank, e.g. the glass articles spend 1 hour in the first immersion tank 300, 30 minutes in the second immersion tank 310 and 10 minutes in the third immersion tank 320. It should also be appreciated that the first liquid 302, second liquid 312 and third liquid 322 can each be maintained at a predetermined and desired temperature. For example, the first liquid 302, second liquid 312 and third liquid 322 can be molten salts that are each maintained at the same temperature (e.g. 500+/−10° C.). In the alternative, the first liquid 302, second liquid 312 and third liquid 322 can be molten salts that each maintained at a different temperature, e.g. the first liquid 302 can be maintained at 500+/−10° C., the second liquid 312 can be maintained at 480+/−10° C. and the third liquid 322 can each be maintained at 420+/−10° C.

Figure 14:
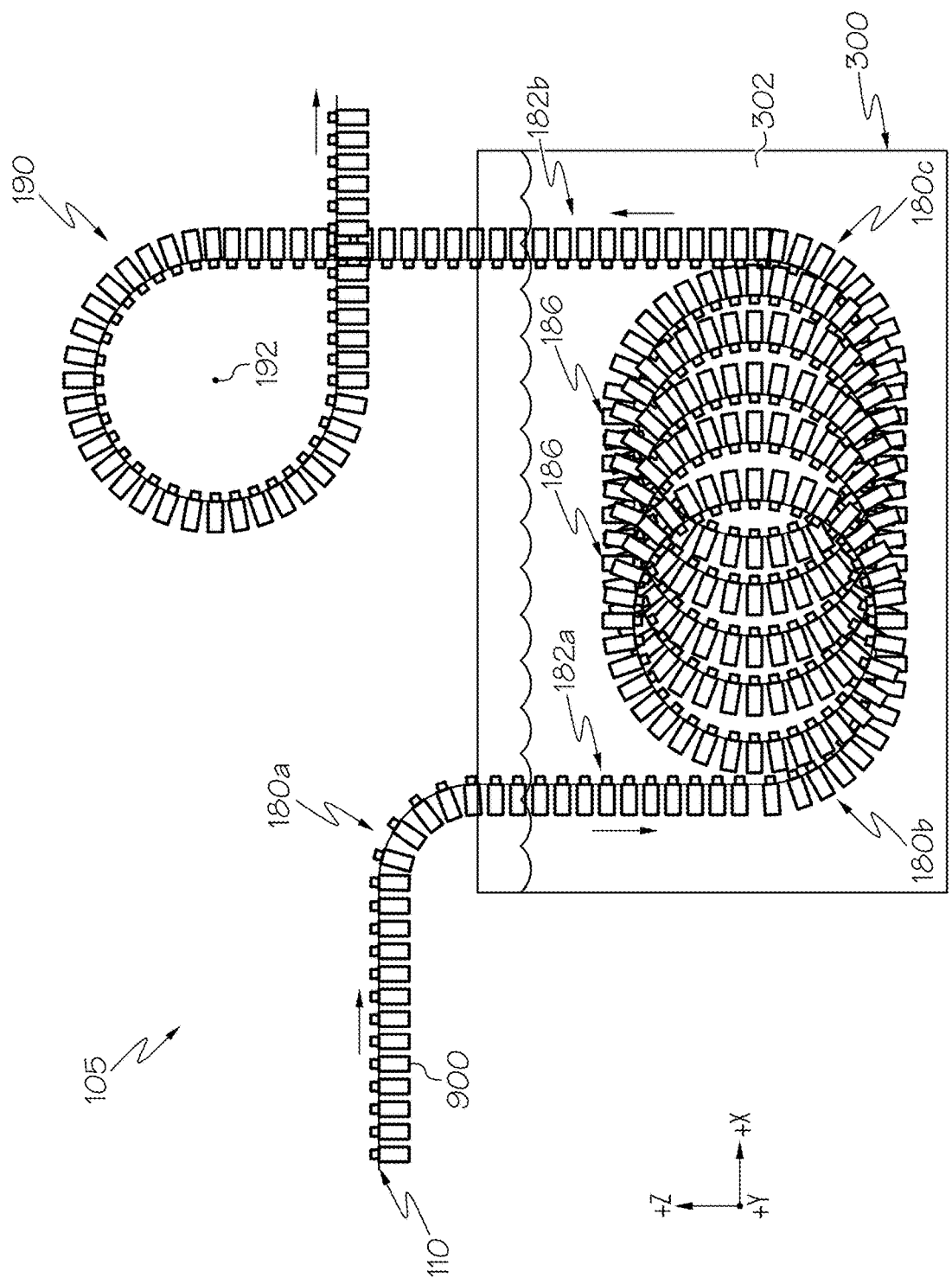
FIG. 14 schematically depicts a side view of a conveyor apparatus, according to one or more embodiments shown and described herein.

Referring now to FIG. 14, in embodiments, a conveyor apparatus 105 for increasing the number of articles 900 processed in the immersion tank 300 for a given processing run is depicted. The conveyor apparatus 105 with the plurality of rollers 210 (not shown) guide and drive the conveyor ribbon 110 with a plurality of articles 900 into the immersion tank 300 containing the liquid 302. The conveyor ribbon 110 with the plurality of articles 900 is driven and guided through the first turn 180a, down into the liquid 302 along the first vertical section 182a and through the second turn 180b. However, instead of traveling along the horizontal section 184 as shown for the conveyor apparatus 100 (FIG. 1) and 103 (FIG. 13), the conveyor ribbon 110 with the plurality of glass articles is driven and guided through one or more loops 186 submerged in the liquid 302. It should be appreciated that the one or more loops allow for a greater number of articles 900 to be processed in the immersion tank 300 per unit time. After passing through the one or more loops 186, the plurality of articles 900 proceed to exit the liquid 302 by passing through the third turn 180c and up the second vertical section 182b. After exiting the liquid 302 and thus the immersion tank 300, the conveyor ribbon 110 with the plurality of articles 900 pass through a drain section 190 and then proceed to an unloading station (not shown).

Figure 15A:
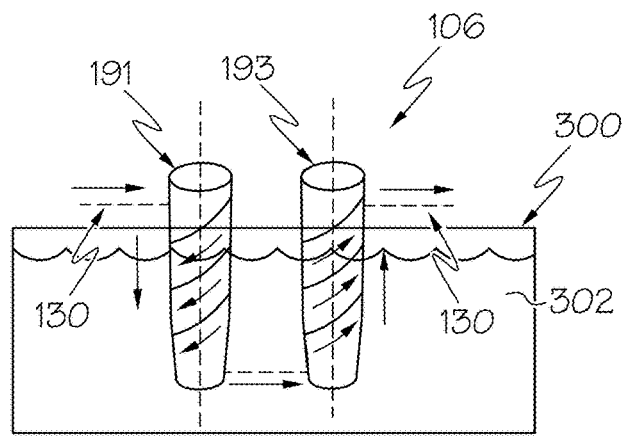
FIG. 15A schematically depicts a side view of a conveyor apparatus, according to one or more embodiments shown and described herein.
Figure 15B:
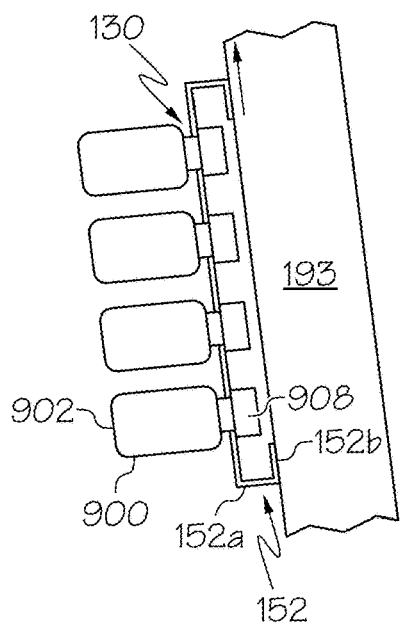
FIG. 15B schematically depicts a side view of a conveyor apparatus, according to one or more embodiments shown and described herein.
Figure 15C:
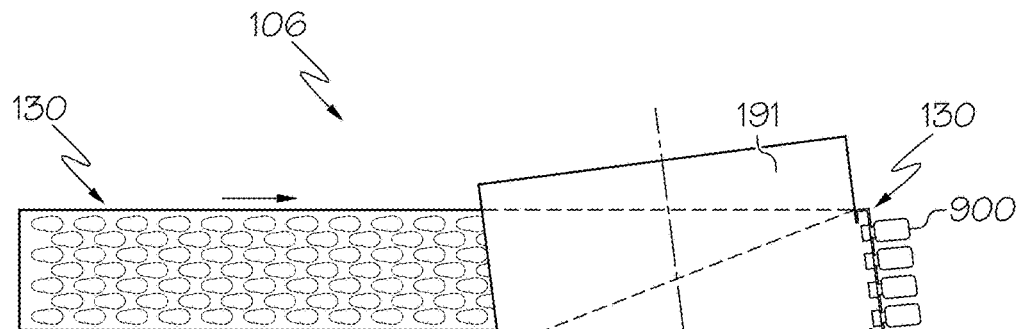
FIG. 15C schematically depicts a side view of a conveyor apparatus, according to one or more embodiments shown and described herein.
Figure 15C:
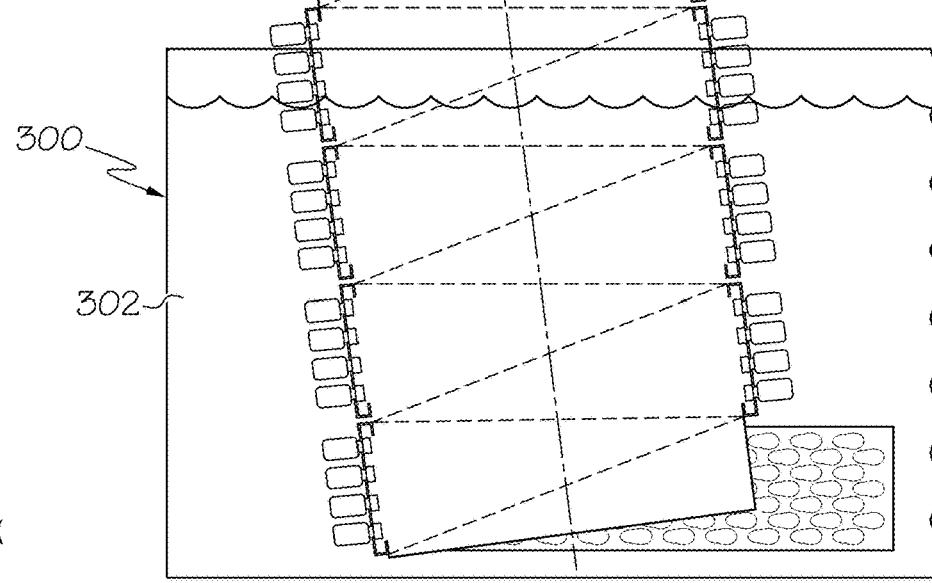

Referring now to FIGS. 15A-15C, in embodiments, a conveyor apparatus 106 is depicted for increasing the number of articles 900 processed in an immersion tank 300 for a given processing run. The conveyor apparatus 106 includes a first drum 191 and a second drum 193. The conveyor apparatus 106 also includes the conveyor ribbon 130 (FIG. 9) with the pair of flanges 152 (FIG. 11) and a plurality of articles 900. FIG. 15A depicts the conveyor ribbon 130 with the plurality of articles 900 entering into an immersion tank 300 (e.g. an ion-exchange tank). The conveyor ribbon 130 with the plurality of articles 900 are wrapped around a circumference and along a length of the first drum 191, and wind down the first drum 191 into a liquid 302 (e.g. molten salt). The conveyor ribbon 130 with the plurality of articles 900 are also wrapped around a circumference and along a length of the second drum 193, and wind up the second drum 193 out of the liquid 302. When the conveyor ribbon 130 with the plurality of articles 900 are wrapped around and winding down the first drum 191 and wrapped around and winding up the second drum 193, the flanges 152 slide along the drums 191, 193 as depicted in FIGS. 15B and 15C. The first drum 191 can rotate in a first direction, e.g. clockwise when looking along the −Z direction, in order to wind the conveyor ribbon 130 with articles 900 down into the immersion tank 300, and the second drum 193 can rotate in a second direction, e.g. counter-clockwise in order to wind the conveyor ribbon 130 and articles 900 up out of the immersion tank 300. The flanges 152 with the first section 152*a* extending from the conveyor ribbon 130 and second section 152*b* extending from the first section 152*a* prevent the collars 908 from contacting and sliding against the first drum 191 and the second drum 193. The first drum 191 and the second drum 193 can be tilted relative to the vertical axis to ensure better filling of the interior 910 of the articles 900 with liquid 302 in the immersion tank 300 and provide enhanced mixing within the immersion tank that can aid thermal and compositional uniformity within the liquid. It should be appreciated that only one drum or more than two drums can be used in a given immersion tank. In addition, the conveyor ribbon 110 (FIGS. 2-8) with the flanges 152 and the conveyor ribbon 140 (FIG. 9) with the flanges 152 can be used with one or more drums to process the articles 900 through one or more immersion tanks.

Figure 16:
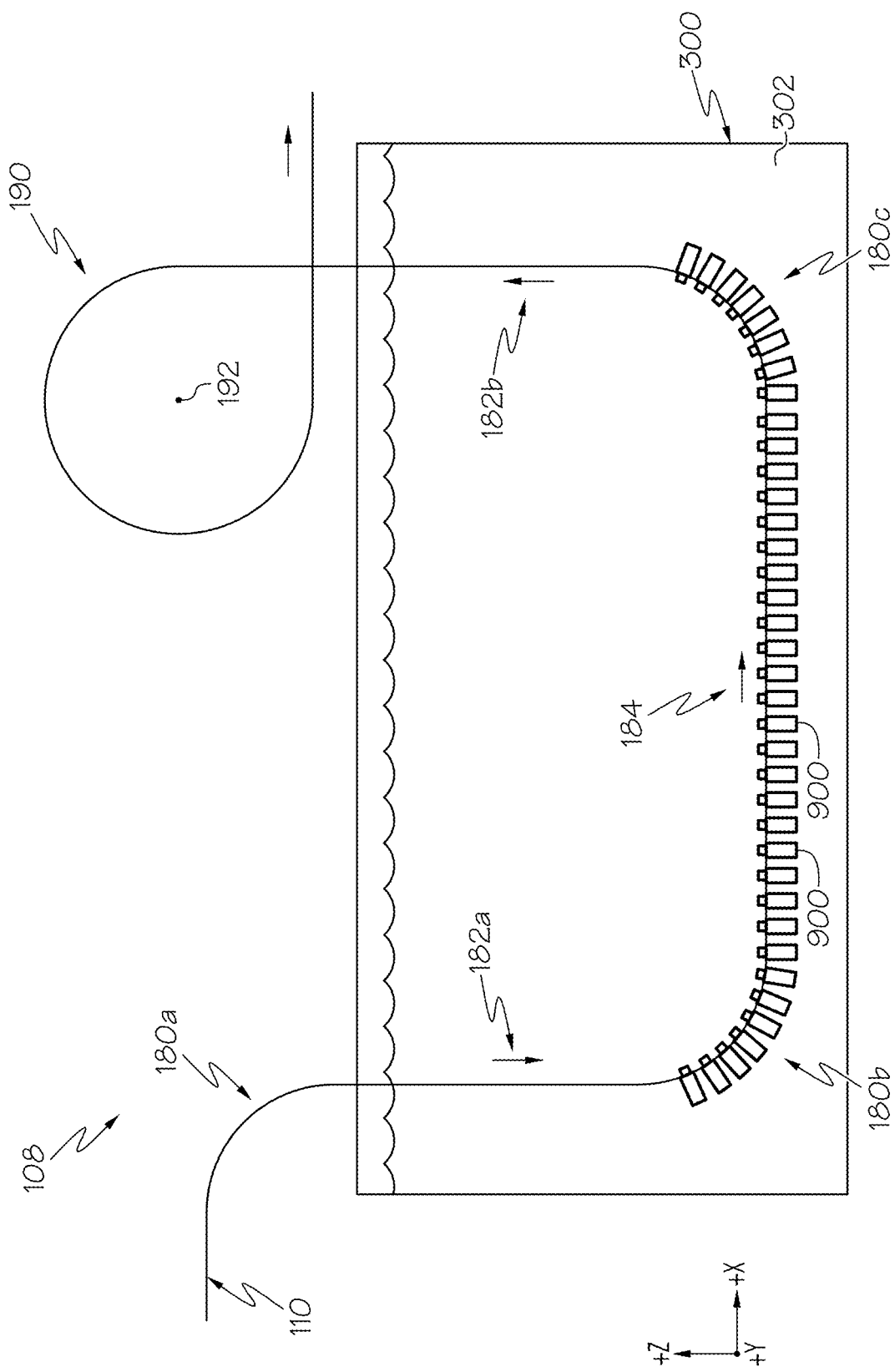
FIG. 16 schematically depicts a side view of a conveyor apparatus, according to one or more embodiments shown and described herein.

Referring now to FIG. 16, a conveyor apparatus 108 for batch processing of articles 900 in an immersion tank 300 containing a liquid 302, e.g. an ion-exchange tank containing a molten salt, is depicted. The conveyor apparatus 108 includes the conveyor ribbon 110, but only a portion of the conveyor ribbon 110 holds and retains the plurality of glass articles. The portion of the conveyor ribbon 110 holding and retaining the plurality of articles 900 is driven and guided by the plurality of rollers 210 (not shown) through the first turn 180*a*, down the first vertical section 182 and through the second turn 180*b*. Once the plurality of articles 900 are located within the liquid 302 at a desired location, e.g. along the horizontal section 184, movement of the conveyor ribbon is stopped and the articles 900 are allowed to remain in the liquid 302 for a predetermined amount of time to facilitate ion-exchange. Then, the conveyor ribbon 110 with the plurality of articles 900 is driven and guided through the third turn 180*c*, up the second vertical section 182*b* and through the drain section 190 before proceeding to an unloading station (not shown). In this manner, batch processing of the plurality of articles 900 in the immersion tank 300 is provided. It should be appreciated that portions of the conveyor ribbon 110 that do not hold and retain any articles 900 during a given batch processing run can have apertures within the conveyor ribbon that are empty. In the alternative, the conveyor ribbon 110 can have only certain portions along its length that have apertures, the remainder of the length of the conveyor ribbon 110 not having apertures to hold and retain articles 900. It should also be appreciated that the conveyor ribbon 130 (FIG. 9) and the conveyor ribbon 140 (FIG. 10) can be used for batch processing of the glass articles in one or more immersion tanks.

Figure 17:
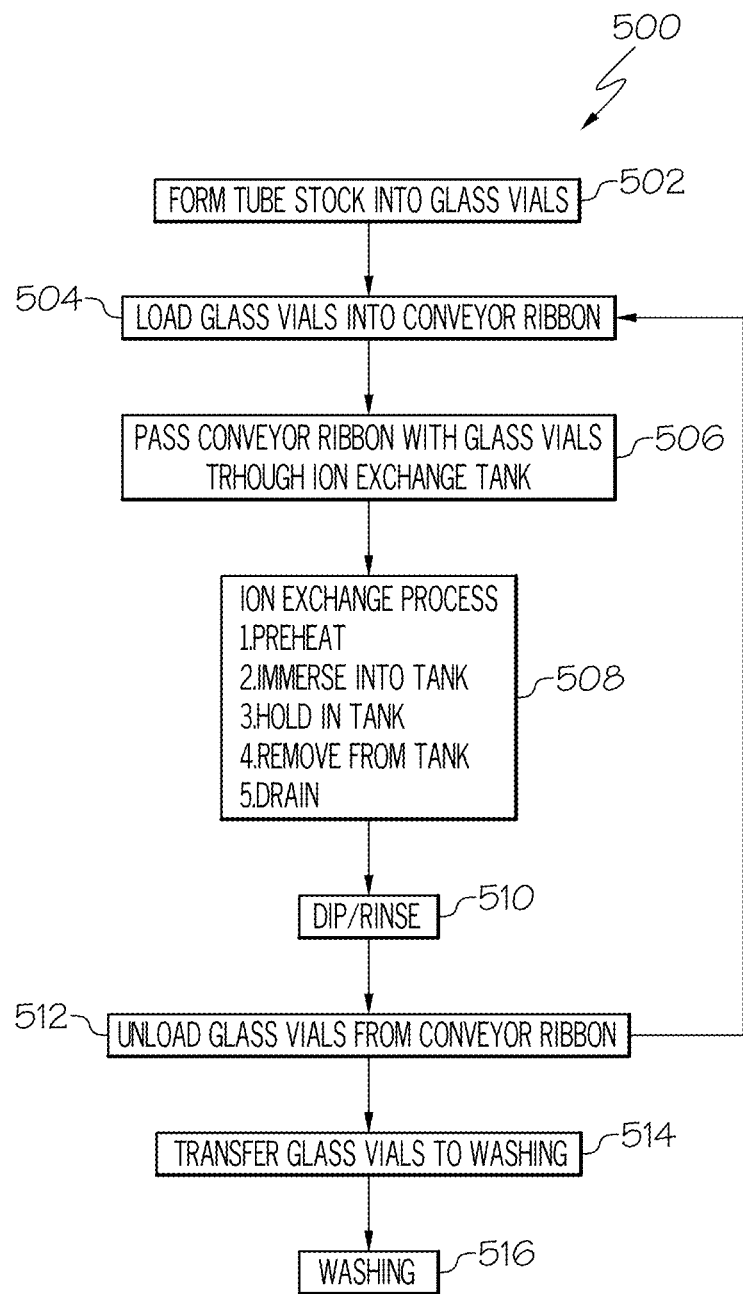
FIG. 17 is a flow diagram of a method for ion-exchange strengthening glass articles with conveyor ribbons, according to one or more embodiments shown and described herein.
Figure 18:
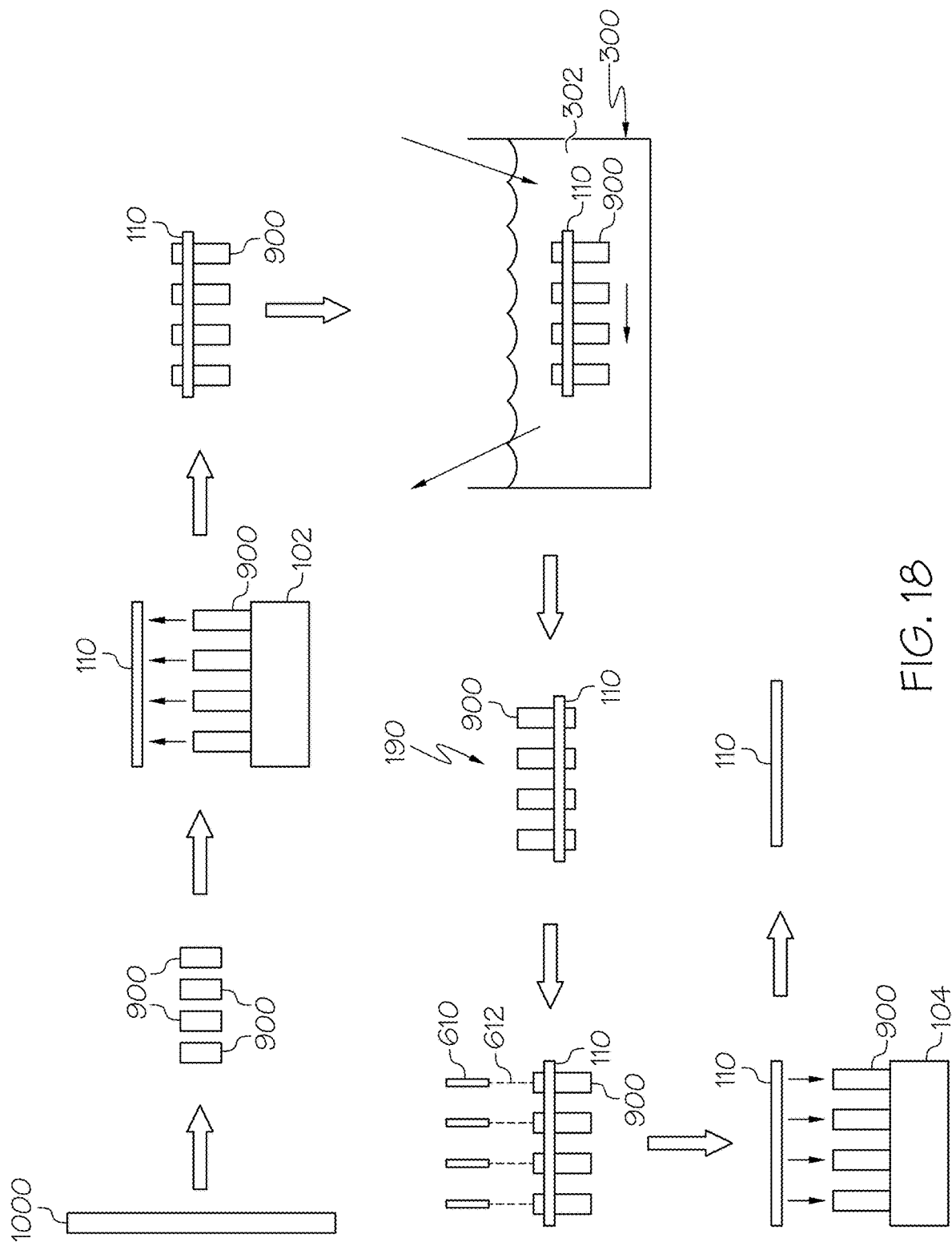
FIG. 18 schematically depicts the method steps of the flow diagram of FIG. 17, according to one or more embodiments shown and described herein.

Referring now to FIGS. 17 and 18, a method 500 for processing articles 900 (e.g. glass vials) using a conveyor ribbon 110 according to embodiments disclosed herein is shown. The method 500 includes forming tube stock 1000 into articles 900 at step 502. The articles 900 are loaded into the conveyor ribbon 110 at a loading station 102 at step 504. The conveyor ribbon with the articles 900 is directed to and through an immersion tank 300 (e.g. an ion-exchange tank) containing liquid 302 (e.g. molten salt) at step 506. The immersion process at step 508 can include a preheat before entering the immersion tank 300, immersion of the articles 900 into the immersion tank, passing the articles 900 through the liquid 302 in the immersion tank 300 such that the articles 900 are within the liquid 302 for a predetermined amount of time, and then removal of the articles 900 from the immersion tank 300. The articles 900 removed from the immersion tank 300 are drained and then proceed to a dip or rinse at step 510. The dip or rinse of the articles 900 can be provided by a plurality of nozzles 610 which spray water 612 onto and into the articles 900 or be provided by the conveyor ribbon 110 with the articles 900 proceeding through a rinse tank (not shown). It should be appreciated that the nozzles 610 and spray water 612 can also rinse the conveyor ribbon 110. The articles 900 are unloaded from the conveyor ribbon 110 at an unloading station 104 at step 512, transferred to a washing station at step 514 and washed at step 516. Alternatively, the articles 900 can be washed prior to unloading from the conveyor ribbon 110.

While the conveyor apparatuses and conveyor ribbons have been shown and described herein being used in conjunction with glass articles such as glass containers, glass vials, etc., it should be understood that the conveyor apparatuses and conveyor ribbons may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It should now be understood that the conveyor apparatuses and conveyor ribbons described herein may be used to hold and retain glass articles during processing. The conveyor apparatuses and conveyor ribbons may mitigate the introduction of flaws in the glass articles retained therein and limit the introduction of flaws to locations of the glass article which are more susceptible to breakage. The design of the conveyor apparatuses and ribbon apparatuses allow for continuous or batch ion-exchange processing of glass articles and also allows for sufficient contact between the glass articles and fluids, such as a salt bath, when the conveyor ribbon is submerged. The conveyor ribbons described herein also have a relatively low thermal mass and surface area which mitigates the degradation of ion-exchange performance.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. An ion exchange system comprising a conveyor apparatus for holding and conveying articles comprising:
   a conveyor ribbon having a length, a width, a thickness less than the width, and a plurality of receiving apertures located along the length and extending through the thickness of the conveyor ribbon, the plurality of receiving apertures configured to receive and hold a plurality of articles;
   a predefined conveyor path comprising an immersion section and a drain section, the immersion section oriented to direct the conveyor ribbon into and out of an immersion station, the conveyor ribbon being rotated about a horizontal axis in the drain section after being directed out of the immersion section; and
   a conveyor ribbon drive and guidance system for directing the conveyor ribbon along the predefined conveyor path, wherein:
   the immersion station is an ion-exchange tank containing molten salt and the conveyor apparatus further comprises a drum within the ion-exchange tank, the conveyor ribbon wrapped around and along a length of the drum; and the drain section is a loop to facilitate rotating the conveyor ribbon about the horizontal axis.

2. The ion exchange system of claim 1, wherein each of the plurality of receiving apertures comprises a keyhole shape with a first portion having a first diameter and a second portion having a second diameter, the first portions receiving the articles into the conveyor ribbon and the second portions retaining the articles.

3. The ion exchange system of claim 2, wherein the thickness of the conveyor ribbon is from about 150 micrometers to about 400 micrometers.

4. The ion exchange system of claim 1, wherein the conveyor ribbon comprises a top ribbon with a plurality of top ribbon apertures and a bottom ribbon with a plurality of bottom ribbon apertures, the top ribbon translatable with respect to the bottom ribbon such that the plurality of top ribbon apertures and the plurality of bottom ribbon apertures align to form the plurality of receiving apertures extending through the thickness of the conveyor ribbon.

5. The ion exchange system of claim 4, wherein the plurality of top ribbon apertures and the plurality of bottom ribbon apertures have a same diameter.

6. The ion exchange system of claim 5, wherein the conveyor ribbon has an open position and a lock position, the plurality of top ribbon apertures are coaxial with the plurality of bottom ribbon apertures when the conveyor ribbon is in the open position and the plurality of top ribbon apertures are offset from the plurality of bottom ribbon apertures when the conveyor ribbon is in the lock position.

7. The ion exchange system of claim 4, wherein the top ribbon has a thickness between 50 to 75 micrometers and the bottom ribbon has a thickness between 150 to 400 micrometers.

8. The ion exchange system of claim 1, wherein each of the plurality of receiving apertures have an outer diameter and a plurality of tabs extending inwardly from the outer diameter towards an aperture center with a distal end of the plurality of tabs defining a generally circular opening with an inner diameter, the plurality of tabs configured to receive and hold the plurality of articles.

9. The ion exchange system of claim 1, further comprising a flange extending from a top surface of the conveyor ribbon, the flange sliding along an outer surface of the drum when the conveyor ribbon is directed into the ion-exchange tank by winding down the drum.

10. The ion exchange system of claim 9, further comprising a first drum and a second drum within the ion-exchange tank, the conveyor ribbon wrapped along and down the first drum into the ion-exchange tank and wrapped along and up the second drum out of the ion-exchange tank.

11. The ion exchange system of claim 10, wherein the flange extending from the top surface of the conveyor ribbon slides along an outer surface of the first drum when the conveyor ribbon is directed into the ion-exchange tank by winding down the first drum and the flange slides along an outer surface of the second drum when the conveyor ribbon is directed out of the ion-exchange tank by winding up the second drum.

12. An ion-exchange system comprising:
a conveyor ribbon having a length, a width, a thickness less than the width, and a plurality of receiving apertures located along the length and extending through the thickness of the conveyor ribbon;

a predefined conveyor path comprising an ion-exchange tank section and a drain section, the ion-exchange tank section including an ion-exchange tank for containing molten salt and a first drum within the ion-exchange tank, the conveyor ribbon extending through at least a portion of the ion-exchange tank in the ion-exchange tank section and wrapping around and along a length of the first drum, the conveyor ribbon being rotated about a horizontal axis in the drain section;

a conveyor drive and guidance system engaged with the conveyor ribbon and directing the conveyor ribbon along the predefined conveyor path, wherein:

the drain section is a loop to facilitate rotating the conveyor ribbon about the horizontal axis.

13. The ion-exchange system of claim 12, wherein each of the plurality of receiving apertures have a keyhole shape with a first portion having a first diameter and a second portion having a second diameter, the first portions dimensioned for receiving glass articles into the conveyor ribbon and the second portions dimensioned for retaining glass articles in the conveyor ribbon.

14. The ion-exchange system of claim 12, wherein the conveyor ribbon comprises a top ribbon with a plurality of top ribbon apertures and a bottom ribbon with a plurality of bottom ribbon apertures, the top ribbon translatable with respect to the bottom ribbon such that the plurality of top ribbon apertures and the plurality of bottom ribbon apertures align to form the plurality of receiving apertures extending through the thickness of the conveyor ribbon.

15. The ion-exchange system of claim 14, wherein the plurality of top ribbon apertures and the plurality of bottom ribbon apertures have a same diameter.

16. The ion-exchange system of claim 15, wherein:
the conveyor ribbon has an open position with the plurality of top ribbon apertures coaxial with the plurality of bottom ribbon apertures and providing a first opening; and the conveyor ribbon has a lock position with the plurality of top ribbon apertures offset from the plurality of bottom ribbon apertures and providing a second opening.

17. The ion-exchange system of claim 16, wherein the first opening is dimensioned for receiving glass articles and the second opening is dimensioned for retaining glass articles.

18. The ion-exchange system of claim 12, wherein each of the plurality of receiving apertures has an outer diameter and a plurality of tabs extending inwardly from the outer diameter towards an aperture center, wherein a distal end of the plurality of tabs define a generally circular opening with an inner diameter equal, the outer diameter receiving glass articles into the conveyor ribbon and the tabs retaining glass articles in the conveyor ribbon.

19. The ion-exchange system of claim 12, further comprising a flange extending from a top surface of the conveyor ribbon, the flange sliding along an outer surface of the first drum when the conveyor ribbon is directed into the ion-exchange tank by winding down the first drum.

20. The ion-exchange system of claim 12, further comprising a second drum within the ion-exchange tank, the conveyor ribbon wrapped along and down the first drum into the ion-exchange tank and wrapped along and up the second drum out of the ion-exchange tank.

21. The ion-exchange system of claim 20, further comprising a flange extending from a top surface of the conveyor ribbon, wherein the flange slides along an outer surface of the first drum when the conveyor ribbon is directed into the ion-exchange tank by winding down the first drum and the flange slides along an outer surface of the second drum when the conveyor ribbon is directed out of the ion-exchange tank by winding up the second drum.

22. An ion exchange system comprising a conveyor apparatus for holding and conveying articles comprising:
- a conveyor ribbon having a length, a width, a thickness less than the width, and a plurality of receiving apertures located along the length and extending through the thickness of the conveyor ribbon, the plurality of receiving apertures configured to receive and hold a plurality of articles;
- a predefined conveyor path comprising an immersion section and a drain section, the immersion section oriented to direct the conveyor ribbon into and out of an immersion station, the conveyor ribbon being rotated about a horizontal axis in the drain section after being directed out of the immersion section; and
- a conveyor ribbon drive and guidance system for directing the conveyor ribbon along the predefined conveyor path, wherein:
  - the immersion station is an ion-exchange tank containing molten salt and the conveyor apparatus further comprises a drum within the ion-exchange tank, the conveyor ribbon wrapped around and along a length of the drum; and
  - the immersion section includes one or more loops through which the conveyor ribbon is driven and guided.

* * * * *